(12) United States Patent
Panchagnula et al.

(10) Patent No.: US 12,088,932 B2
(45) Date of Patent: Sep. 10, 2024

(54) METHODS AND APPARATUS FOR ENCODING, COMMUNICATING AND/OR USING IMAGES

(71) Applicant: Nevermind Capital LLC, Wilmington, DE (US)

(72) Inventors: Ramesh Panchagnula, Irvine, CA (US); David Cole, Aliso Viejo, CA (US); Alan Moss, Laguna Beach, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

(21) Appl. No.: 18/168,521

(22) Filed: Feb. 13, 2023

(65) Prior Publication Data

US 2023/0199333 A1 Jun. 22, 2023

Related U.S. Application Data

(63) Continuation of application No. 16/858,531, filed on Apr. 24, 2020, now Pat. No. 11,582,384.
(Continued)

(51) Int. Cl.
*H04N 23/951* (2023.01)
*G06T 19/00* (2011.01)
*H04N 19/587* (2014.01)

(52) U.S. Cl.
CPC ........... *H04N 23/951* (2023.01); *G06T 19/00* (2013.01); *H04N 19/587* (2014.11)

(58) Field of Classification Search
CPC ............. H04N 5/23232; H04N 19/587; H04N 13/111; H04N 13/139; H04N 13/194;
(Continued)

(56) References Cited

U.S. PATENT DOCUMENTS

2005/0041740 A1\* 2/2005 Sekiguchi ............ H04N 19/587
375/E7.153
2008/0239144 A1 10/2008 Tanase
(Continued)

FOREIGN PATENT DOCUMENTS

CN  101518068 A  8/2009
CN  102868879 A  1/2013
(Continued)

OTHER PUBLICATIONS

Liu, et al., "Bayesian Frame Interpolation by Fusing Multiple Motion-Compensated Prediction Frames," 18th IEEE International Conference on Image Processing, 2011.
(Continued)

*Primary Examiner* — Hung H Lam
(74) *Attorney, Agent, or Firm* — Blank Rome LLP

(57) ABSTRACT

Methods and apparatus for capturing, communicating and using image data to support virtual reality experiences are described. Images, e.g., frames, are captured at a high resolution but lower frame rate than is used for playback. Interpolation is applied to captured frames to generate interpolated frames. Captured frames, along with interpolated frame information, are communicated to the playback device. The combination of captured and interpolated frames correspond to a second frame playback rate which is higher than the image capture rate. Cameras operate at a high image resolution but slower frame rate than images could be captured with the same cameras at a lower resolution. Interpolation is performed prior to delivery to the user device with segments to be interpolated being selected based on motion and/or lens FOV information. A relatively small amount of interpolated frame data is communicated compared to captured frame data for efficient bandwidth use.

20 Claims, 15 Drawing Sheets

Related U.S. Application Data

(60) Provisional application No. 62/838,300, filed on Apr. 24, 2019.

(58) Field of Classification Search
CPC .. H04N 13/243; H04N 13/275; H04N 13/344; H04N 19/132; H04N 19/137; H04N 19/172; H04N 19/597; G06T 19/00
See application file for complete search history.

(56) References Cited

U.S. PATENT DOCUMENTS

| | | | | |
|---|---|---|---|---|
| 2011/0058016 | A1* | 3/2011 | Hulyalkar | H04N 13/139 |
| | | | | 348/E13.001 |
| 2012/0268562 | A1 | 10/2012 | Wang | |
| 2013/0177294 | A1* | 7/2013 | Kennberg | H04N 21/816 |
| | | | | 386/E9.011 |
| 2015/0346812 | A1 | 12/2015 | Cole | |
| 2017/0064325 | A1* | 3/2017 | Lim | H04N 19/543 |
| 2017/0067739 | A1* | 3/2017 | Siercks | G06T 7/97 |
| 2017/0133054 | A1* | 5/2017 | Song | G11B 27/28 |
| 2019/0116352 | A1* | 4/2019 | Pesonen | H04N 19/132 |

FOREIGN PATENT DOCUMENTS

| | | |
|---|---|---|
| CN | 108876700 A | 11/2018 |
| CN | 109672886 A | 4/2019 |
| JP | 2011155431 A | 8/2011 |

OTHER PUBLICATIONS

Yin, Yajing, "Research on Motion Estimation algorithm in Frame Rate Up-conversion," Chinese Master's Theses Full-text Database, Dec. 15, 2013.

Zheng Ren, et al., "Frame rate up-conversion with motion region segmentation based optimization," Image and Signal Processing (CISP), 2012 5th International Congress on, IEEE, Oct. 16, 2012 (Oct. 16, 2012), DOI: 10.11.09/CISP.2012.6469967, ISBN: 978-1-4673-0965-3.

* cited by examiner

CF1
INCLUDING IDENTIFIED MOTION SEGMENTS WITH DETERMINED CORRESPONDING VELOCITY VECTORS,
SELECTED RATES (R1, R2, R3, R4, R5) TO BE USED FOR INTERPOLATION ARE BASED ON DETERMINED VELOCITY VECTORS AND LOCATION OF SEGMENTS IN FOV

METHODS AND APPARATUS FOR ENCODING, COMMUNICATING AND/OR USING IMAGES

RELATED APPLICATIONS

This application is a continuation of U.S. application Ser. No. 16/858,531, filed on Apr. 24, 2020, which claims priority to U.S. provisional application No. 62/838,300 which was filed on Apr. 24, 2019, both of which are expressly incorporated by reference in their entirety.

FIELD

The present invention relates to methods and apparatus for encoding and communicated images with motion for virtual reality systems, e.g., systems which support playback on a virtual reality device, e.g., which can render 2D or 3D image content.

BACKGROUND

High quality image capture can be important for realistic virtual reality applications. Unfortunately, the capture of high resolution images at a high frame rate can involve the use of extremely expensive high speed high resolution cameras which may not be practical for cost reasons for many applications.

While capturing of high resolution images to support virtual reality is desirable, communicating a large number of high resolution images in their entirety can present communications problems given bandwidth constraints of communications networks available for transmitted images to playback devices.

The problem of image capture and data transmission constraints is an issue with non-stereo systems becomes particularly acute in the context of 3D video and 3D virtual reality systems where separate left and right eye image data normally needs to be communicated.

In the case of 3D virtual reality systems the difference between left and right eye image content is what is normally conveys to a human observer the sense of depth and the 3D nature of the objects being viewed. Accordingly for a realistic depth experience it is often important to capture and preserve image details.

In view of the above, it should be appreciated that there are need for methods and apparatus for supporting the use of high resolution images for virtual reality applications. It would be desirable if the image capture rate did not need to match the image playback rate to allow for use of cameras that might not support the desired image playback rate while capturing images at a high level of detail. In addition, there is a need for methods and apparatus that can support playback and sufficient detail information that allow for a user of a playback system to enjoy the experience. It is desirable that at least some of the methods and/or apparatus address the problem of communicating image content to playback devices with limited bandwidth for the delivery of such content and that at least some of the methods be usable where the content may include objects in motion such as what might be expected at a sporting event where a ball or other object might be moving. All embodiments need not address all the above discussed issues with embodiments and features addressing one or more of the discussed issues being useful and desirable.

SUMMARY

Methods and apparatus for capturing, communicating and using image data to support virtual reality experiences are described. Images, e.g., frames, are captured at a high resolution but lower frame rate, than is to be supported for playback. Interpolation is applied to captured frames. Captured frames along with interpolated frame information are communicated to a playback device. The combination of captured and interpolated frames corresponds to a second frame playback rate which is higher than the image capture rate. By operating cameras at a high image resolution but slower frame rate than images could be captured with the same cameras at a lower resolution detail is preserved. Interpolation is performed prior to delivery to the user device with segments to be interpolated being selected based on motion and/or lens field of view (FOV) information. A relatively small amount of interpolated frame data is communicated compared to captured frame data for efficient use of bandwidth.

While various features are discussed in this summary, all embodiments need not include all the features discussed in the summary. Accordingly a discussion or mention of one or more features in this summary is not intended to imply that the discussed feature or features is essential or necessary in all embodiments.

The described methods and apparatus have several advantages over other approaches. The method addresses and avoids some of the more severe motion artifacts when playing immersive content on certain HMDs (head mounted displays) which might occur when content is limited to being updated at the captured frame rate. By understanding the nature of the artifacts, e.g., that they are created due to motion and/or the shape of the lens portion used to capture the image portion, the method addresses reduces the risk of such artifacts by selectively updating high motion segments and/or segments corresponding to portions of the camera lenses subject to high distortions, without having the need to configure multiple VR (virtual reality) systems.

The method also cuts down complexity of processing and bandwidth needed to deliver content as compared to other systems, with fewer artifact problems than some known systems since the methods make efficient use of the limited bandwidth available to communicate image data to playback devices. One or more aspects of the methods can be implemented on an embedded device at the last point of the content delivery pipeline.

An exemplary content distribution method is directed to a content distribution a method that includes method comprising storing images that were captured at a first frame rate; performing interpolation to generate interpolated frame data to support a second frame rate which is higher than said first frame rate; and communicating captured frame data and interpolated frame data to at least one playback device.

The invention is also directed to various playback system features, methods and embodiments.

One exemplary method embodiment is directed to a method of operating a playback system, the method comprising: receiving captured frame data and interpolated frame data; recovering captured frames from the received captured frame data; generating one or more interpolated frames from received interpolated frame data; rendering a video sequence including one or more captured frames and at least one interpolated frame; and outputting one or more rendered images to a display device.

Numerous variations on the above described methods and apparatus are possible.

DETAILED DESCRIPTION

Figure 1:
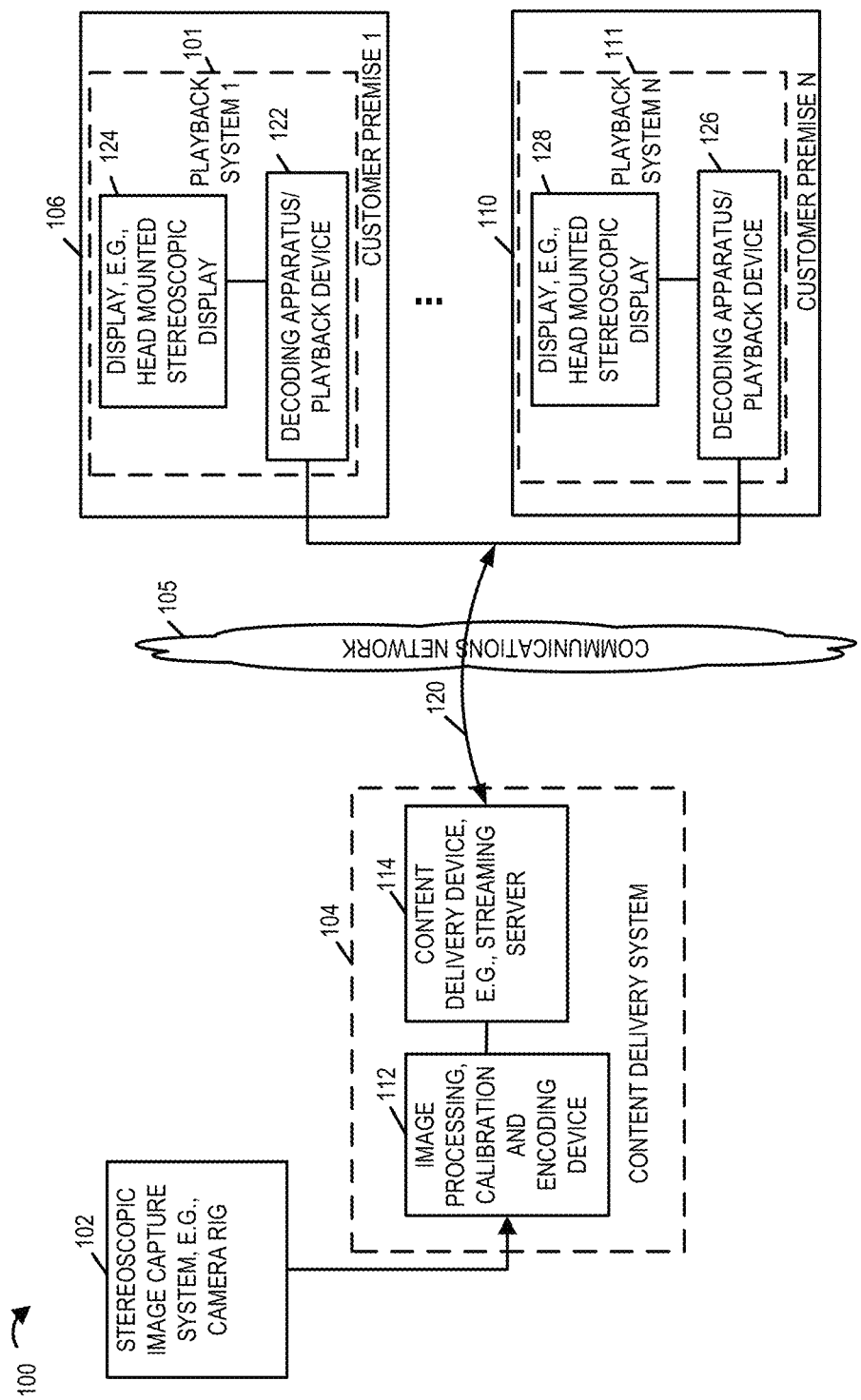
FIG. 1 illustrates an exemplary system implemented in accordance with some embodiments of the invention which can be used to capture, stream content, and output content to one or more users.

FIG. 1 illustrates an exemplary system 100 implemented in accordance with some embodiments of the invention. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an image processing, calibration and encoding apparatus 112 and a content delivery device 114, e.g. a streaming server 114. The image processing, calibration and encoding apparatus 112 is responsible for performing a variety of functions including camera calibration based on one or more target images and/or grid patterns captured during a camera calibration process, generation of a distortion correction or compensation mesh which can be used by a playback device to compensate for distortions introduced by a calibrated camera, processing, e.g., cropping and encoding of captured images, and supplying calibration and/r environmental information to the content delivery device 114 which can be supplied to a playback device and used in the rendering/image playback process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content may be and sometimes is a function of feedback information such as viewer head position and/or user selection of a position at the event corresponding to a camera rig 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that a single camera rig 102 is shown in FIG. 1 multiple camera rigs may be present in the system and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content to deliver the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server 114 are shown as separate physical devices in the FIG. 1 example, in some embodiments they are implemented as a single device which encodes and streams content. The encoding process may be a 3d, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of playback systems, e.g., devices/players, e.g., apparatus that can decode and playback/display the imaging content streamed by the content streaming device 114. Customer premise 1 106 includes a playback system 101 that includes a decoding apparatus/playback device 122 coupled to a display device 124. Customer premise N 110 includes a playback system 111 including a decoding apparatus/playback device 126 coupled to a display device 128. In some embodiments the display devices 124, 128 are head mounted stereoscopic display devices. In various embodiments the playback system 101 is a headmounted system supported by a strap that is worn around the user's head. Thus, in some embodiments, customer premise 1 106 includes playback system 1 101 which includes decoding apparatus/playback device 122 coupled to display 124, e.g., a head mounted stereoscopic display, and customer premise N 110 includes playback system N 111 which includes decoding apparatus/playback device 126 coupled to display 128, e.g., a head mounted stereoscopic display, In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 3. A system/playback device such as the one illustrated in FIG. 3 can be used as any of the decoding apparatus/playback devices 122, 126.

Figure 3:
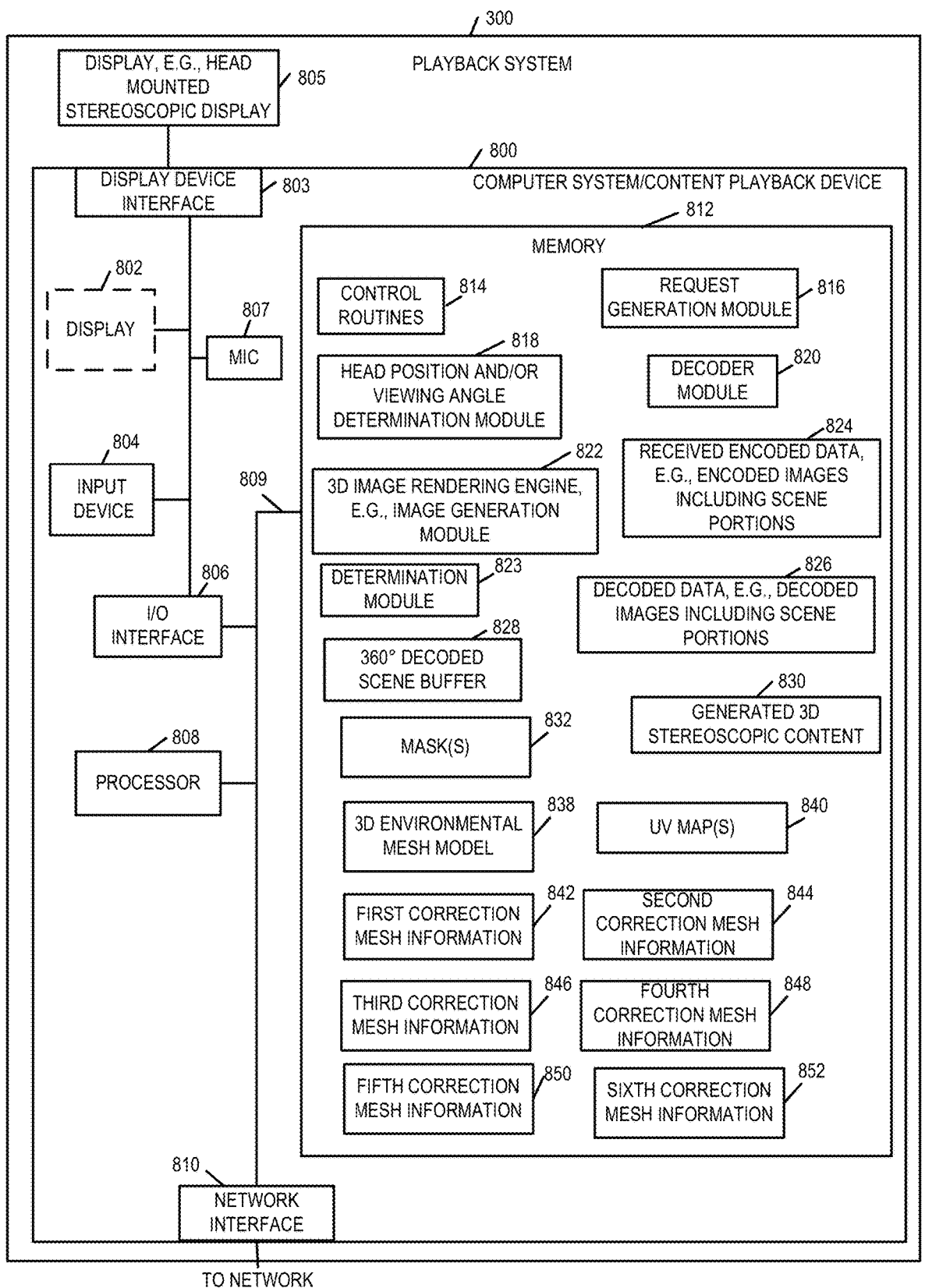
FIG. 3 illustrates an exemplary content playback system that can be used to receive, decode and display the content streamed by the system of FIG. 2.

FIG. 3 illustrates an exemplary content delivery system 700 with encoding capability that can be used to encode and stream content in accordance with the features of the invention.

The system may be used to perform object detection, encoding, storage, and transmission and/or content output in accordance with the features of the invention. The content delivery system 700 may be used as the system 104 of FIG. 1. While the system shown in FIG. 3 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the system 700 to implement the partitioning, encoding, storage, and streaming/transmission and/or output operations in accordance with the invention.

The memory 712 includes various modules, e.g., routines, which when executed by the processor 707 control the computer system 700 to implement the immersive stereoscopic video acquisition, encoding, storage, and transmission and/or output methods in accordance with the invention. The memory 712 includes control routines 714, a partitioning module 706, encoder(s) 718, a detection module 719, a streaming controller 720, received input images 732, e.g., 360 degree stereoscopic video of a scene, encoded scene portions 734, timing information 736, an environmental mesh model 738, UV maps(s) 740 and a plurality of correction mesh information sets including first correction mesh information 742, second correction mesh information 744, third correction mesh information 746, fourth correction mesh information 748, fifth correction mesh information 750 and sixth correction mesh information 752. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware. The memory 712 also includes a frame buffer 715 for storing captured images, e.g., left and right eye images captured by left and right cameras of a camera pair and/or interpolated frame data representing interpolated frames generated by interpolating between the captured frames a s buffered frame sequence. Segment definition and position change information is stored in some embodiments in portion 717 of memory 712. The definition information may and sometimes does define a set of blocks corresponding to an object which is interpreted as a image segment.

As will be discussed below, the interpolated frames may and sometimes do include one or more interpolated segments which are combined with data from a preceding or subsequent frame to form a complete interpolated frame. In various embodiments the interpolated frames are represented using a fraction of the data used to represent a captured frame, e.g., ½0th or less, in some cases ¹⁄₁₀₀th, the amount of data used to represent an captured frame that is intra-coded. Thus when transmitting encoded and interpolated frames, interpolated frames can be communicated using relatively little data. In some cases the decoder of a playback device 122 performs a default fill operation using image content from a preceding frame to fill in the portions of an interpolated frame which are not communicated to the playback device. Segments of interpolated frames which are produced by interpolation may be communicated to the playback device 122 as inter-coded data using motion vectors or as intra-coded data depending on the embodiment.

The control routines 714 include device control routines and communications routines to control the operation of the system 700. The partitioning module 716 is configured to partition a received stereoscopic 360 degree version of a scene into N scene portions in accordance with the features of the invention.

The encoder(s) 718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

The detection module 719 is configured to detect a network controlled switch from streaming content from a current camera pair, e.g., first stereoscopic camera pair, to another camera pair, e.g., a second or third stereoscopic camera pair. That is the detection module 719 detects if the system 700 has switched from streaming content stream generated using images captured by a given stereoscopic camera pair, e.g., a first stereoscopic camera pair, to streaming content stream generated using images captured by another camera pair. In some embodiments the detection module is further configured to detect a user controlled change from receiving a first content stream including content from the first stereoscopic camera pair to receiving a second content stream including content from the second stereoscopic camera pair, e.g., detecting a signal from user playback device indicating that the playback device is attached to a different content stream than a content to which it was attached previously. The streaming controller 720 is configured to control streaming of encoded content for delivering the encoded image content to one or more customer devices, e.g., over the communications network 105.

The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver in the network interface 710. In some embodiments the request for content includes information indicating the identity of requesting playback device. In some embodiments the request for content may include data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determination module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives ad processes the information to determine the current viewing angle and/or a current head position.

The selection module 728 is configured to determine which portions of a 360 degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360 degree stereoscopic scene, at various supported data rates in accordance with the features of the invention. In some embodiments the streaming control module 730 is configured to control stream N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360 degree scene update to the playback device in accordance with a time interval, e.g., once every minute. In some embodiments sending 360 degree scene update includes sending N scene portions or N–X scene portions of the full 360 degree stereoscopic scene, where N is the total number of portions into which the full 360 degree stereoscopic scene has been partitioned and X represents the selected scene portions recently sent to the playback device. In some embodiments the streaming control module 730 waits for a predetermined time after initially sending N scene portions for initialization before sending the 360 degree scene update. In some embodiments the timing information to control sending of the 360 degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured to communicate at least a sufficient number of the N portions to the playback device on a periodic basis to allow the playback device to fully refresh a 360 degree version of said scene at least once during each refresh period.

Figure 4:
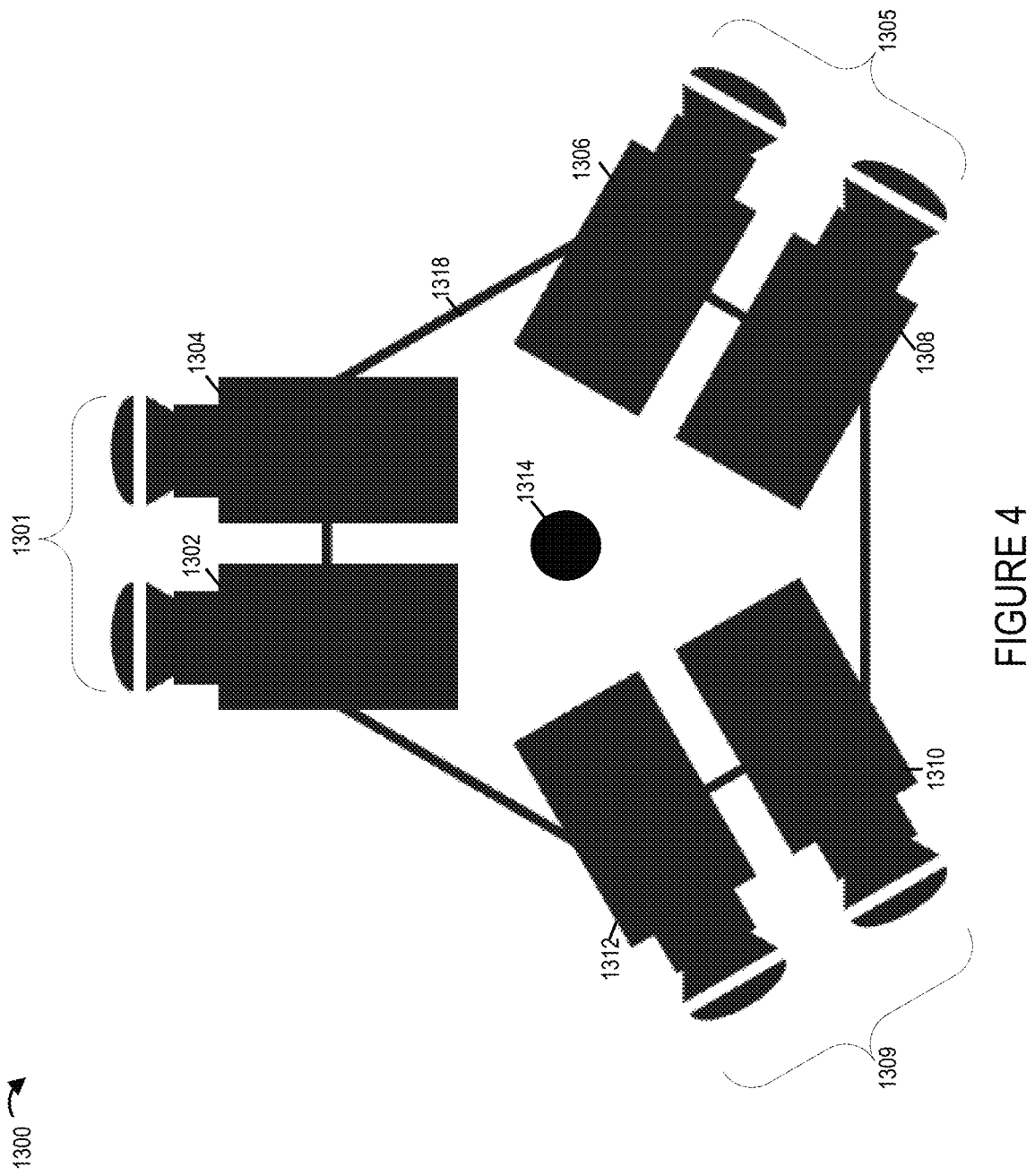
FIG. 4 illustrates a camera rig including multiple camera pairs for capturing left and right eye images corresponding to different 120 degree sectors of a 360 degree field of view along with a camera or cameras directed towards the sky to capture a sky view.

In some embodiments streaming controller 720 is configured to control the system 700 to transmit, e.g., via a transmitter in the network interface 710, a stereoscopic content stream (e.g., encoded content stream 734) including encoded images generated from image content captured by one or more cameras, e.g., cameras of stereoscopic camera pairs such as illustrated in FIG. 4. In some embodiments streaming controller 720 is configured to control the system 700 to transmit, to one or more playback devices, an environmental mesh model 738 to be used in rendering image content. In some embodiments streaming controller 720 is further configured to transmit to a playback device a first UV map to be used for mapping portions of images captured by a first stereoscopic camera pair to a portion of the environmental mesh model as part of a image rendering operation.

In various embodiments the streaming controller 720 is further configured to provide (e.g., transmit via a transmitter in the network interface 710) one or more sets of correction mesh information, e.g., first, second, third, fourth, fifth, sixth, correction mesh information to a playback device. In some embodiments the first correction mesh information is for use in rendering image content captured by a first camera of a first stereoscopic camera pair, the second correction mesh information is for use in rendering image content captured by a second camera of the first stereoscopic camera pair, the third correction mesh information is for use in rendering image content captured by a first camera of a second stereoscopic camera pair, the fourth correction mesh information is for use in rendering image content captured by a second camera of the second stereoscopic camera pair, the fifth correction mesh information is for use in rendering image content captured by a first camera of a third stereoscopic camera pair, the sixth correction mesh information is for use in rendering image content captured by a second camera of the third stereoscopic camera pair. In some embodiments the streaming controller 720 is further configured to indicate, e.g., by sending a control signal, to the playback device that the third and fourth correction mesh information should be used when content captured by the second stereoscopic camera pair is streamed to the playback device instead of content from the first stereoscopic camera pair. In some embodiments the streaming controller 720 is further configured to indicate to the playback device that the third and fourth correction mesh information should be used in response to the detection module 719 detecting i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

The memory 712 further includes the environmental mesh model 738, UV map(s) 740, and sets of correction mesh information including first correction mesh information 742, second correction mesh information 744, third correction mesh information 746, fourth correction mesh information 748, fifth correction mesh information 750 and sixth correction mesh information 752. The system provides the environmental mesh model 738 to one or more playback devices for use in rendering image content. The UV map(s) 740 include at least a first UV map to be used for mapping portions of images captured by the first stereoscopic camera pair to a portion of the environmental mesh model 738 as part of a image rendering operation. The first correction mesh information 742 includes information generated based on measurement of one or more optical characteristics of a first lens of said first camera of the first stereoscopic camera pair and the second correction mesh includes information generated based on measurement of one or more optical characteristic of a second lens of said second camera of the first stereoscopic camera pair. In some embodiments the first and second stereoscopic camera pairs correspond to a forward viewing direction but different locations at an area or event location where content is being captured for streaming.

In some embodiments the processor 708 is configured to perform the various functions corresponding to the steps discussed in flowcharts 600 and/or 2300. In some embodiments the processor uses routines and information stored in memory to perform various functions and control the system 700 to operate in accordance with the methods of the present invention. In one embodiments the processor 708 is configured to control the system to provide the first correction mesh information and the second correction mesh information to a playback device, the first correction mesh information being for use in rendering image content captured by the first camera, the second correction mesh information being for use in rendering image content captured by the second camera. In some embodiments the first stereoscopic camera pair corresponds to a first direction and the processor is further configured to control the system 700 to transmit a stereoscopic content stream including encoded images generated from image content captured by the first and second cameras. In some embodiments the processor 708 is further configured to transmit to the playback device an environmental mesh model to be used in rendering image content. In some embodiments the processor 708 is further configured to transmit to the playback device a first UV map to be used for mapping portions of images captured by the first stereoscopic camera pair to a portion of the environmental mesh model as part of a image rendering operation. In some embodiments the processor 708 is further configured to control the system 700 to provide third correction mesh information and fourth correction mesh information to the playback device, the third correction mesh information being for use in rendering image content captured by a first camera of a second stereoscopic camera pair, the fourth correction mesh information being for use in rendering image content captured by a second camera of the second stereoscopic camera pair. In some embodiments the processor 708 is further configured to control the system 700 to indicate (e.g., transmit via network interface 710) to the playback device that the third and fourth correction mesh information should be used when content captured by the second camera pair is streamed to the playback device instead of content from the first camera pair. In some embodiments the processor 708 is further configured to control the system 700 to indicate to the playback device that the third and fourth correction mesh information should be used in response to the system detecting: i) a network controlled switch from streaming content from the first stereoscopic camera pair to the second stereoscopic pair or ii) a user controlled change from receiving a first content stream including content from the first stereoscopic camera pair to receiving a second content stream including encoded content from the second stereoscopic camera pair. In some embodiments the processor 708 is further configured to control the system 700 to system to provide the fifth and sixth correction mesh information to the playback device, the fifth correction mesh information being for use in rendering image content captured by the first camera of the third stereoscopic camera pair, the sixth correction mesh information being for use in rendering image content captured by the second camera of the third stereoscopic camera pair.

FIG. 3 illustrates a playback system 300 implemented in accordance with an exemplary embodiment of the present invention. Playback system 300 is, e.g., playback system 101 or playback system 111 of FIG. 1. Exemplary playback system 300 includes computer system/playback device 800 coupled to display 805, e.g., a head mounted stereoscopic display. Computer system/playback device 800 implemented in accordance with the present invention can be used to receive, decode, store and display imaging content received from a content delivery system such as the one shown in FIGS. 1 and 2. The playback device may be used with a 3D head mounted display such as the OCULUS RIFT™ VR (virtual reality) headset which may be the head mounted display 805. The device 800 includes the ability to decode the received encoded image data and generate 3D image content for display to the customer. The playback device in some embodiments is located at a customer premise location such as a home or office but may be located at an image capture site as well. The device 800 can perform signal reception, decoding, display and/or other operations in accordance with the invention.

The device 800 includes a display 802, a display device interface 803, input device 804, microphone (mic) 807, input/output (I/O) interface 806, a processor 808, network interface 810 and a memory 812. The various components of the playback device 800 are coupled together via bus 809 which allows for data to be communicated between the components of the system 800. While in some embodiments display 802 is included as an optional element as illustrated using the dashed box, in some embodiments an external display device 805, e.g., a head mounted stereoscopic display device, can be coupled to the playback device via the display device interface 803.

Via the I/O interface 806, the system 800 can be coupled to external devices to exchange signals and/or information with other devices. In some embodiments via the I/O interface 806 the system 800 can receive information and/or images from an external device and output information and/or images to external devices. In some embodiments via the interface 806 the system 800 can be coupled to an external controller, e.g., such as a handheld controller.

The processor 808, e.g., a CPU, executes routines 814 and modules in memory 812 and uses the stored information to control the system 800 to operate in accordance with the invention. The processor 808 is responsible for controlling the overall general operation of the system 800. In various embodiments the processor 808 is configured to perform functions that have been discussed as being performed by the playback system 800.

Via the network interface 810 the system 800 communicates and/or receives signals and/or information (e.g., including encoded images and/or video content corresponding to a scene) to/from various external devices over a communications network, e.g., such as communications network 105. In some embodiments the system receives one or more content streams including encoded images captured by one or more different cameras via the network interface 810 from the content delivery system 700. The received content stream may be stored as received encoded data, e.g., encoded images 824. In some embodiments the interface 810 is configured to receive a first encoded image including image content captured by a first camera and a second encoded image corresponding to a second camera. The network interface 810 includes a receiver and a transmitter via which the receiving and transmitting operations are performed. In some embodiments the interface 810 is configured to receive correction mesh information corresponding to a plurality of different cameras including first correction mesh information 842, second correction mesh information 844, third correction mesh information 846, fourth correction mesh information 848, fifth correction mesh information 850 and sixth correction mesh information 852 which are then stored in memory 812. Furthermore in some embodiments via the interface 810 the system receives one or more mask(s) 832, an environmental mesh model 838, UV maps(s) 840 which are then stored in memory 812.

The memory 812 includes various modules, e.g., routines, which when executed by the processor 808 control the playback device 800 to decoding and output operations in accordance with the invention. The memory 812 includes control routines 814, a request for content generation module 816, a head position and/or viewing angle determination module 818, a decoder module 820, a stereoscopic image rendering engine 822 also referred to as a 3D image generation module, a determination module, and data/information including received encoded image content 824, decoded image content 826, a 360 degree decoded scene buffer 828, generated stereoscopic content 830, mask(s) 832, an environmental mesh model 838, UV maps(s) 840 and a plurality of received correction mesh information sets including first correction mesh information 842, second correction mesh information 844, third correction mesh information 846, fourth correction mesh information 848, fifth correction mesh information 850 and sixth correction mesh information 852.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data, e.g., decoded images 826. The decoded image data 826 may include decoded stereoscopic scene and/or decoded scene portions. In some embodiments the decoder 820 is configured to decode the first encoded image to generate a first decoded image and decode the second received encoded image to generate a second decoded image. The decoded first and second images are included in the stored decoded image images 826.

The 3D image rendering engine 822 performs the rendering operations (e.g., using content and information received and/or stored in memory 812 such as decoded images 826, environmental mesh model 838, UV map(s) 840, masks 832 and mesh correction information) and generates 3D image in accordance with the features of the invention for display to the user on the display 802 and/or the display device 805. The generated stereoscopic image content 830 is the output of the 3D image generation engine 822. In various embodiments the rendering engine 822 is configured to perform a first rendering operation using the first correction information 842, the first decoded image and the environmental mesh model 838 to generate a first image for display. In various embodiments the rendering engine 822 is further configured to perform a second rendering operation using the second correction information 844, the second decoded image and the environmental mesh model 838 to generate a second image for display. In some such embodiments the rendering engine 822 is further configured to use a first UV map (included in received UV map(s) 840) to perform the first and second rendering operations. The first correction information provides information on corrections to be made to node positions in the first UV map when the first rendering operation is performed to compensate for distortions introduced into the first image by a lens of the first camera and the second correction information provides information on corrections to be made to node positions in the first UV map when the second rendering operation is performed to compensate for distortions introduced into the second image by a lens of the second camera. In some embodiments the rendering engine 822 is further configured to use a first mask (included in mask(s) 832) to determine how portions of the first image are combined with portions of a first image corresponding to a different field of view as part of the first rendering operation when applying portions of the first image to a surface of the environmental mesh model as part of the first rendering operation. In some embodiments the rendering engine 822 is further configured to use the first mask to determine how portions of the second image are combined with a portions of a second image corresponding to the different field of view as part of the second rendering operation when applying portions of the second image to the surface of the environmental mesh model as part of the second rendering operation. The generated stereoscopic image content 830 includes the first and second images (e.g., corresponding to left and right eye views) generated as a result of the first and second rendering operation. In some embodiments the portions of a first image corresponding to a different field of view correspond to a sky or ground field of view. In some embodiments the first image is a left eye image corresponding to a forward field of view and the first image corresponding to a different field of view is a left eye image captured by a third camera corresponding to a side field of view adjacent the forward field of view. In some embodiments the second image is a right eye image corresponding to a forward field of view and wherein the second image corresponding to a different field of view is a right eye image captured by a fourth camera corresponding to a side field of view adjacent the forward field of view. Thus the rendering engine 822 renders the 3D image content 830 to the display. In some embodiments the operator of the playback device 800 may control one or more parameters via input device 804 and/or select operations to be performed, e.g., select to display 3D scene.

The network interface 810 allows the playback device to receive content from the streaming device 114 and/or communicate information such as view head position and/or position (camera rig) selection indicating selection of particular viewing position at an event. In some embodiments the decoder 820 is implemented as a module. In such embodiments when executed the decoder module 820 causes received images to be decoded while 3D image rendering engine 822 causes further processing of the images in accordance with the present invention and optionally stitching of images together as part of the presentation process.

In some embodiments the interface 810 is further configured to receive additional mesh correction information corresponding to a plurality of different cameras, e.g., third, fourth, fifth and sixth mesh correction information. In some embodiments the rendering engine 822 is further configured to use mesh correction information corresponding to a fourth camera (e.g., fourth mesh correction information 848) when rendering an image corresponding to a fourth camera, the fourth camera being one of the plurality of different cameras. The determination module 823 is configured to determine which mesh correction information is to be used by the rendering engine 822 when performing a rendering operation based on which camera captured image content is being used in the rendering operation or based an indication from a server indicating which mesh correction information should be used when rendering images corresponding to a received content stream. The determination module 823 may be implemented as part of the rendering engine 822 in some embodiments.

Figure 2:
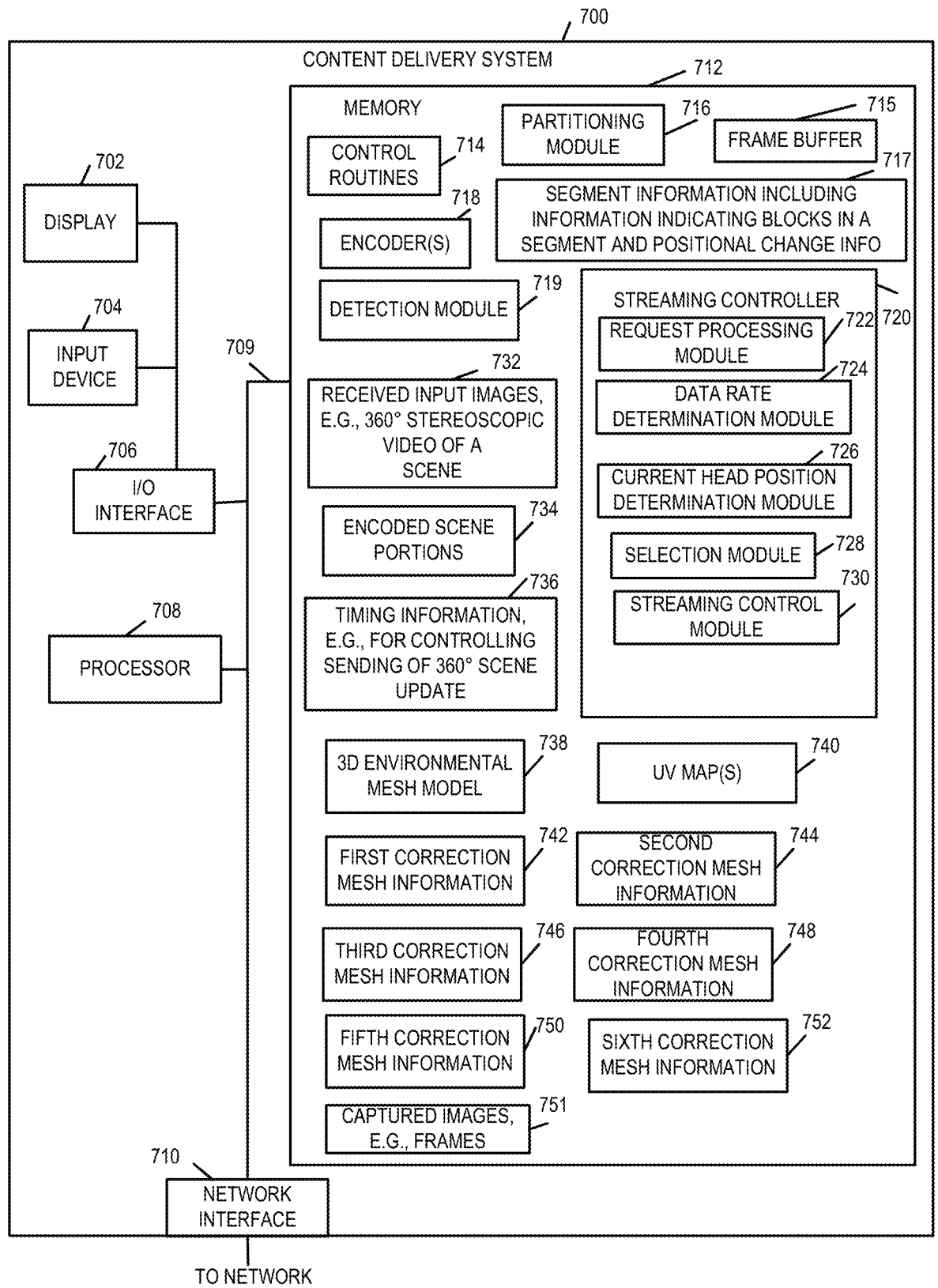
FIG. 2 illustrates an exemplary content delivery system with encoding capability that can be used to encode and stream content in accordance with the features of the invention.

In some embodiments the modules and/or elements shown in the memory 712 of FIG. 2 and memory 812 of FIG. 3 are implemented as software modules. In other embodiments the modules and/or elements, while shown to be included in the memory, are implemented in hardware, e.g., as individual circuits with each element being implemented as a circuit for performing the function corresponding to the element. In still other embodiments the modules and/or elements are implemented using a combination of software and hardware.

While shown in FIGS. 2 and 3 to be included in the memory, the elements shown included in the system 700 and 800 can, and in some embodiments are, implemented fully in hardware within the processor, e.g., as individual circuits, of the corresponding device, e.g., within the processor 708 in case of the content delivery system and within the processor 808 in the case of playback system 800. In other embodiments some of the elements are implemented, e.g., as circuits, within the corresponding processors 708 and 808 with other elements being implemented, e.g., as circuits, external to and coupled to the processors. As should be appreciated the level of integration of modules on the processor and/or with some modules being external to the processor may be one of design choice. Alternatively, rather than being implemented as circuits, all or some of the elements may be implemented in software and stored in the memory, with the software modules controlling operation of the respective systems 700 and 800 to implement the functions corresponding to the modules when the modules are executed by their respective processors, e.g., processors 708 and 808. In still other embodiments, various elements are implemented as a combination of hardware and software, e.g., with a circuit external to the processor providing input to the processor which then under software control operates to perform a portion of a module's function.

Figure 7:
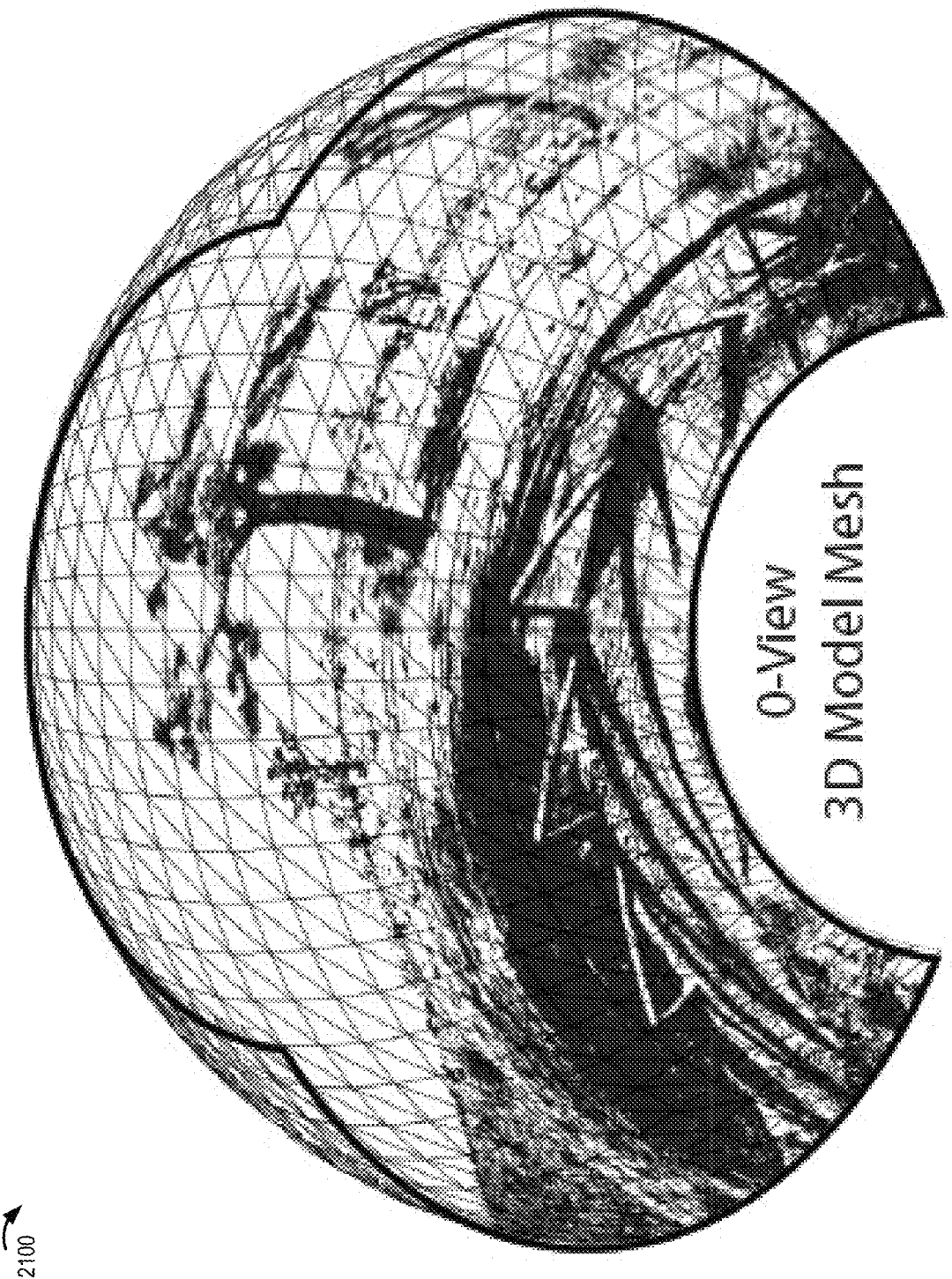
FIG. 7 shows an environmental mesh model corresponding to one sector of the camera rig with one of the images applied, e.g., projected, onto the environmental mesh to generate a background image.
Figure 8:
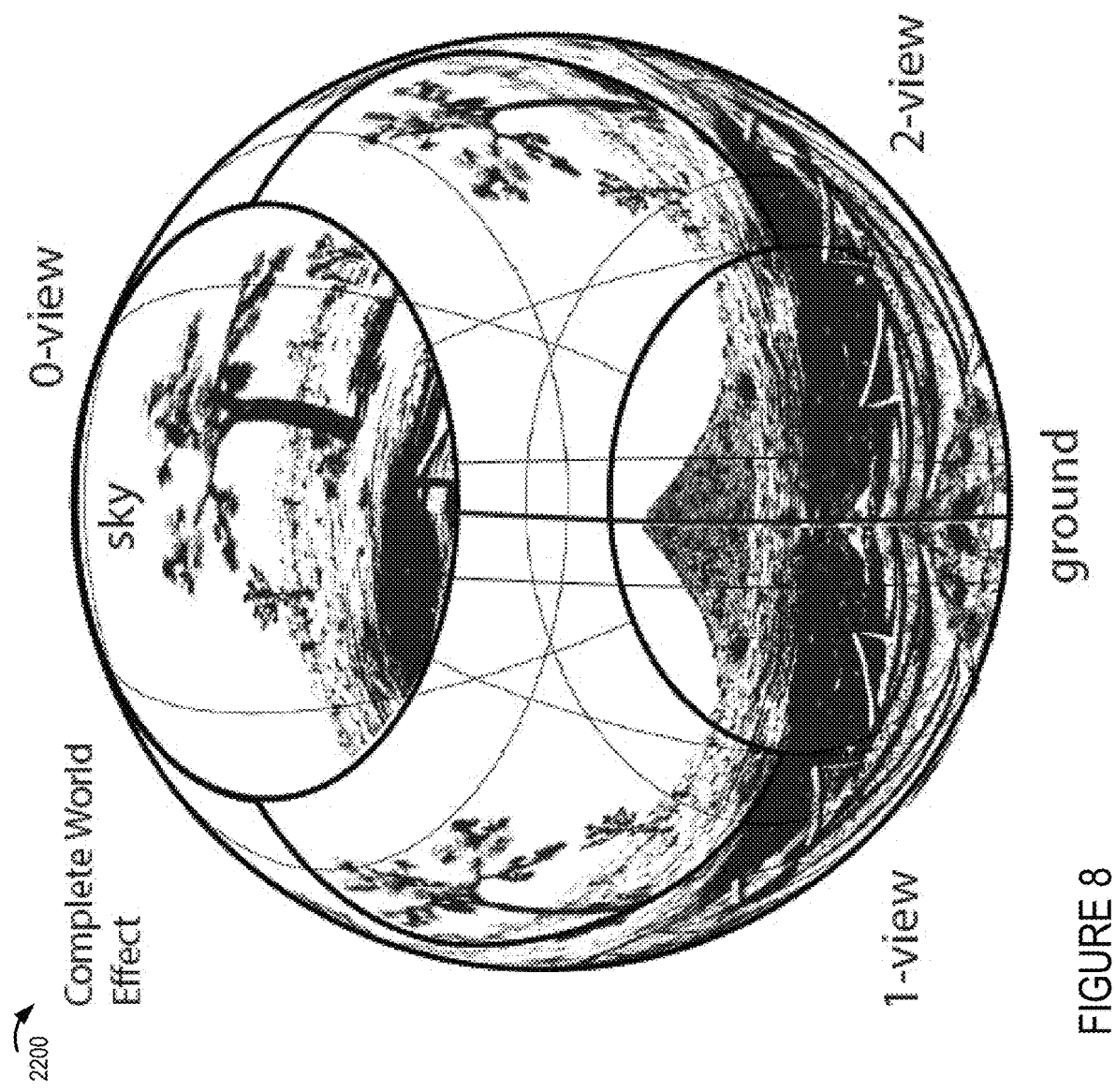
FIG. 8 shows application of images captured by cameras corresponding each of the sectors as well as the sky and ground cameras of the camera rig to simulate a complete 3D environment in the form of a sphere which can be used as a background to which foreground objects can be applied.

While shown in each of FIGS. 2 and 3 embodiments as a single processor, e.g., computer, it should be appreciated that each of the processors 708 and 808 may be implemented as one or more processors, e.g., computers. When one or more elements in the memory 712 and 812 are implemented as software modules, the modules include code, which when executed by the processor of the corresponding system (e.g., processor 708 and 808) configure the processor to implement the function corresponding to the module. In embodiments where the various modules shown in FIGS. 7 and 8 are stored in memory, the memory is a computer program product comprising a computer readable medium comprising code, e.g., individual code for each module, for causing at least one computer, e.g., processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 2 control and/or configure the system 700 or elements therein such as the processor 708, to perform the functions of corresponding steps of the methods of the present invention, e.g., such as those illustrated and/or described in the flowcharts. Similarly the modules illustrated in FIG. 3 control and/or configure the system 800 or elements therein such as the processor 808, to perform the functions of corresponding steps of the methods of the present invention, e.g., such as those illustrated and/or described in a flowchart.

To facilitate an understanding of the image capture process reference will now be made to the exemplary camera rig shown in FIG. 4. The camera rig 1300 can be used as the rig 102 of the FIG. 1 system and includes a plurality of stereoscopic camera pairs each corresponding to a different one of three sectors. The first stereoscopic camera pair 1301 includes a left eye camera 1302 (e.g., first camera) and a right camera 1304 (e.g., second camera) intended to capture images corresponding to those which would be seen by a left and right eye of a person positioned at the location of the first camera pair. Second stereoscopic camera pair 1305 corresponds to a second sector and includes left and right cameras 1306, 1308 while the third stereoscopic camera pair 1309 corresponds to a third sector includes left and right cameras 1310, 1312. Each camera is mounted in a fixed position in the support structure 1318. An upward facing camera 1314 is also included. A downward facing camera which is not visible in FIG. 4 may be included below camera 1314. Stereoscopic camera pairs are used in some embodiments to capture pairs of upward and downward images however in other embodiments a single upward camera and a single downward camera are used. In still other embodiments a downward image is captured prior to rig placement and used as a still ground image for the duration of an event. Such an approach tends to be satisfactory for many applications given that the ground view tends not to change significantly during an event. The output of the cameras of the rig 1300 are captured and processed.

Figure 5:
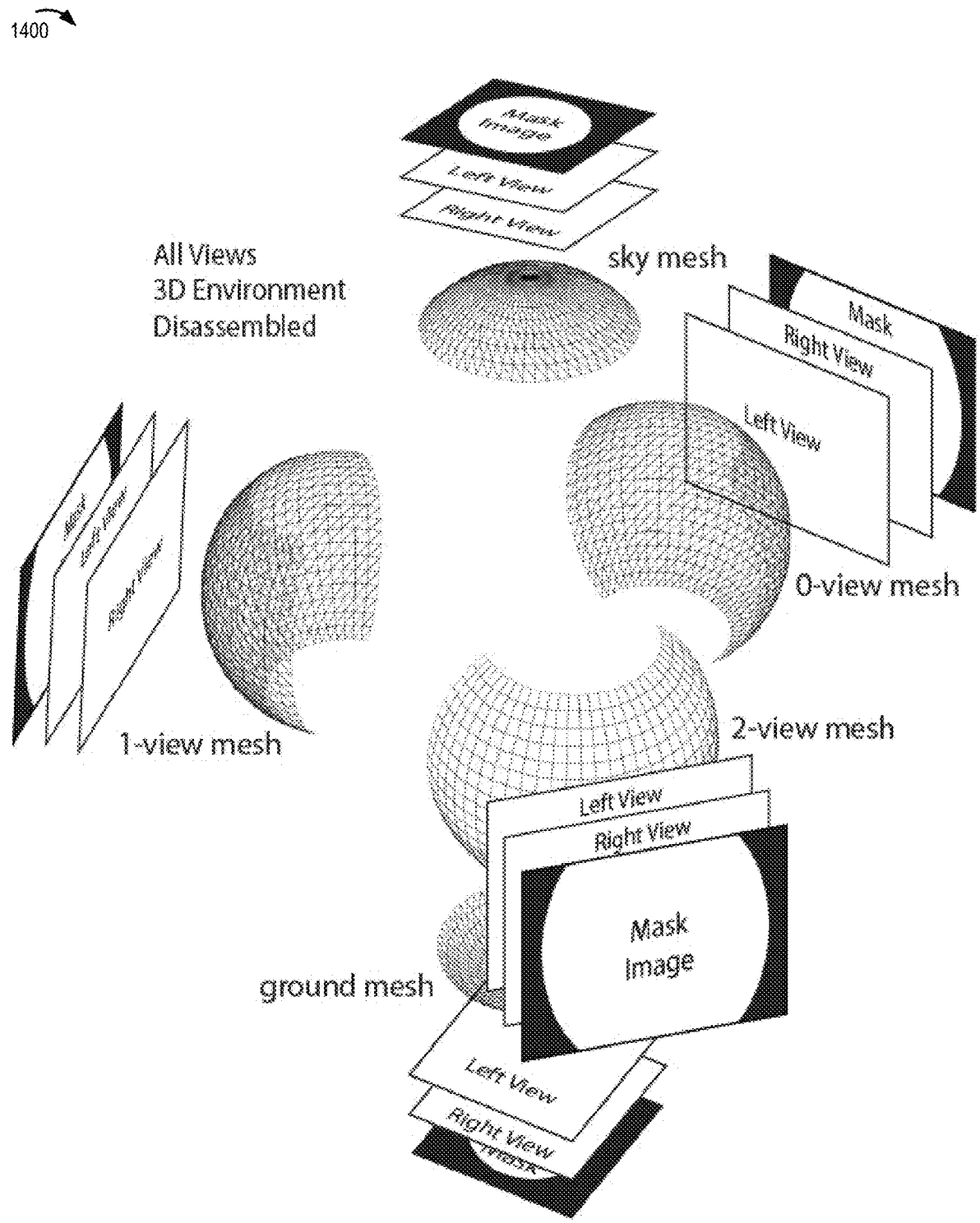
FIG. 5 shows how 5 different environmental mesh maps, corresponding to different camera views, can be combined to create a complete spherical view/environment onto which background images can be applied as part of a playback operation.

When the FIG. 4 camera rig is used each of the sectors corresponds to a known 120 degree viewing area with respect to the camera rig position, with the captured images from different sector pairs being seamed together based on the images know mapping to the simulated 3D environment. While a 120 degree portion of each image captured by a sector camera is normally used, the cameras capture a wider image corresponding to approximately a 180 degree viewing area. Accordingly, captured images may be subject to masking in the playback device as part of the 3D environmental simulation. FIG. 5 is a composite diagram 1400 showing how a 3D spherical environment can be simulated using environmental mesh portions which correspond to different camera pairs of the rig 102. Note that one mesh portion is shown for each of the sectors of the rig 102 with a sky mesh being used with regard to the top camera view and the ground mesh being used for the ground image captured by the downward facing camera. While the masks for the top and bottom images are round in nature, the masks applied to the sector images are truncated to reflect that top and bottom portions of the scene area will be supplied by the top and bottom cameras respectively.

Figure 6:
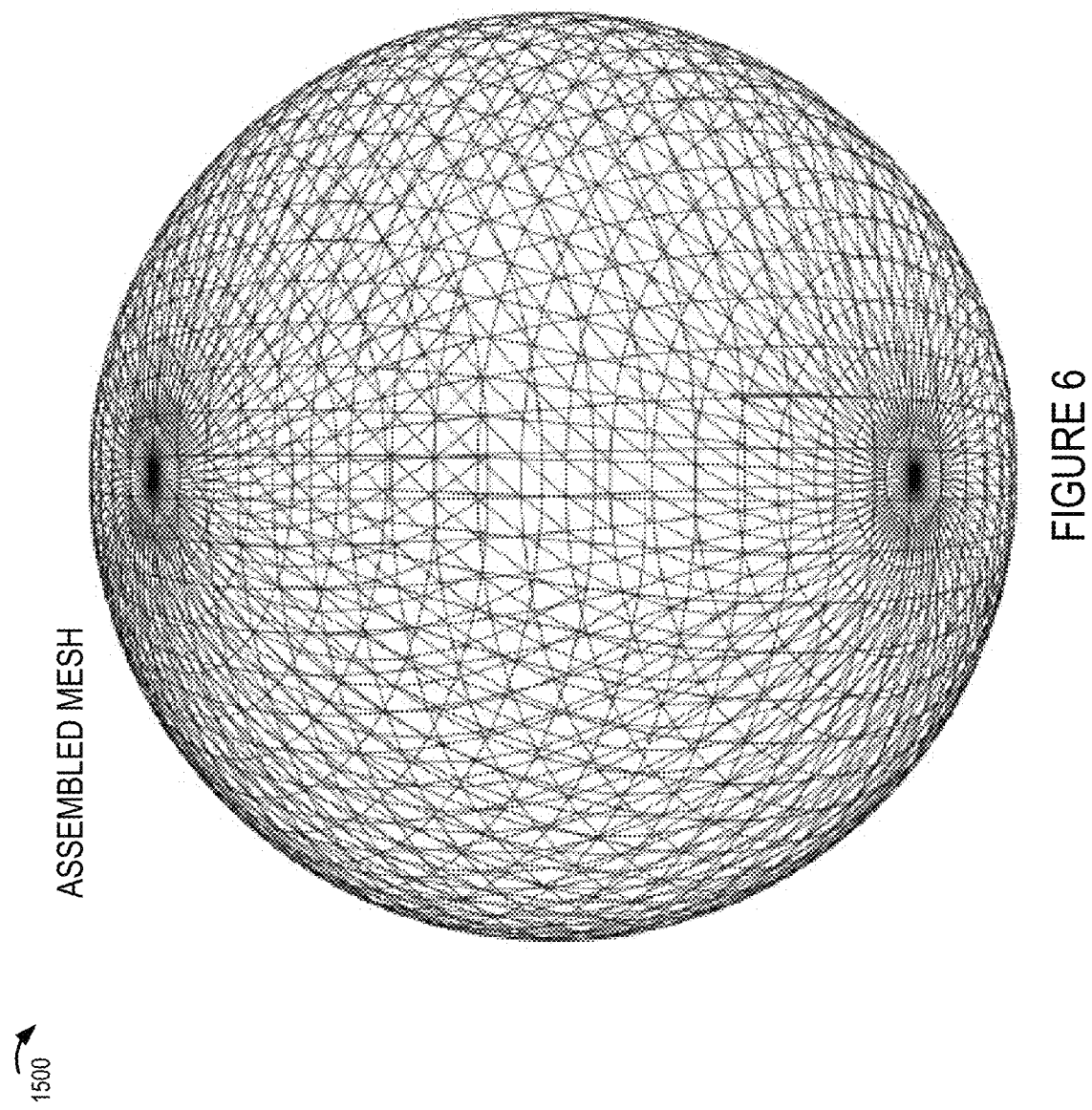
FIG. 6 shows the full assembly of 5 meshes to create a spherical simulated environment

When combined the overall meshes corresponding to different cameras results in a spherical mesh as shown in FIG. 6. Note that the mesh is shown for a single eye image but that it is used for both the left and right eye images in the case of stereoscopic image pairs being captured.

Mesh and masking information of the type shown in FIG. 5 can and sometimes is communicated to the playback device. The communicated information will vary depending on the rig configuration. For example if a larger number of sectors were used masks corresponding to each of the sectors would correspond to a small viewing area than 120 degrees with more than 3 environmental grids being required to cover the diameter of the sphere.

Environmental map information is shown being optionally transmitted in step 1132 to the playback device. It should be appreciated that the environmental map information is optional in that the environment may be assumed to be a default size sphere in the event such information is not communicated. In cases where multiple different default size spheres are supported an indication as to what size sphere is to be used may be and sometimes is communicated to the playback device.

Image capture operations may be performed on an ongoing basis during an event particularly with regard to each of the 3 sectors which can be captured by the camera rig 102.

Note that while multiple camera views are captured corresponding to different sectors the image capture rate need not be the same for all sectors. For example, a front facing sector corresponding to e.g., the main playing field may capture images at a fast frame rate that the cameras corresponding to other sectors and/or the top (sky) and bottom (ground) views.

FIG. 7 illustrates mapping of an image portion corresponding to a first sector to the corresponding 120 degree portion of the sphere representing the 3D viewing environment.

Images corresponding to different portions of the 360 degree environment are combined the extent needed to provide a contiguous viewing area to the viewer, e.g., depending on head position. For example, if the viewer is looking at the intersection of two 120 degree sectors portions of the image corresponding to each sector will be seemed and presented together to the viewer based on the know angle and position of each image in the overall 3D environment being simulated. The seeming and generation of an image will be performed for each of the left and right eye views so that two separate images are generated, one per eye, in the case of a stereoscopic implementation.

FIG. 8 shows how multiple decoded, corrected, and cropped images can be, and sometime are, mapped and seemed together to create a 360 degree viewing environment which can be used as a background to which foreground images of objects represented by point cloud data can be applied.

Figure 9:
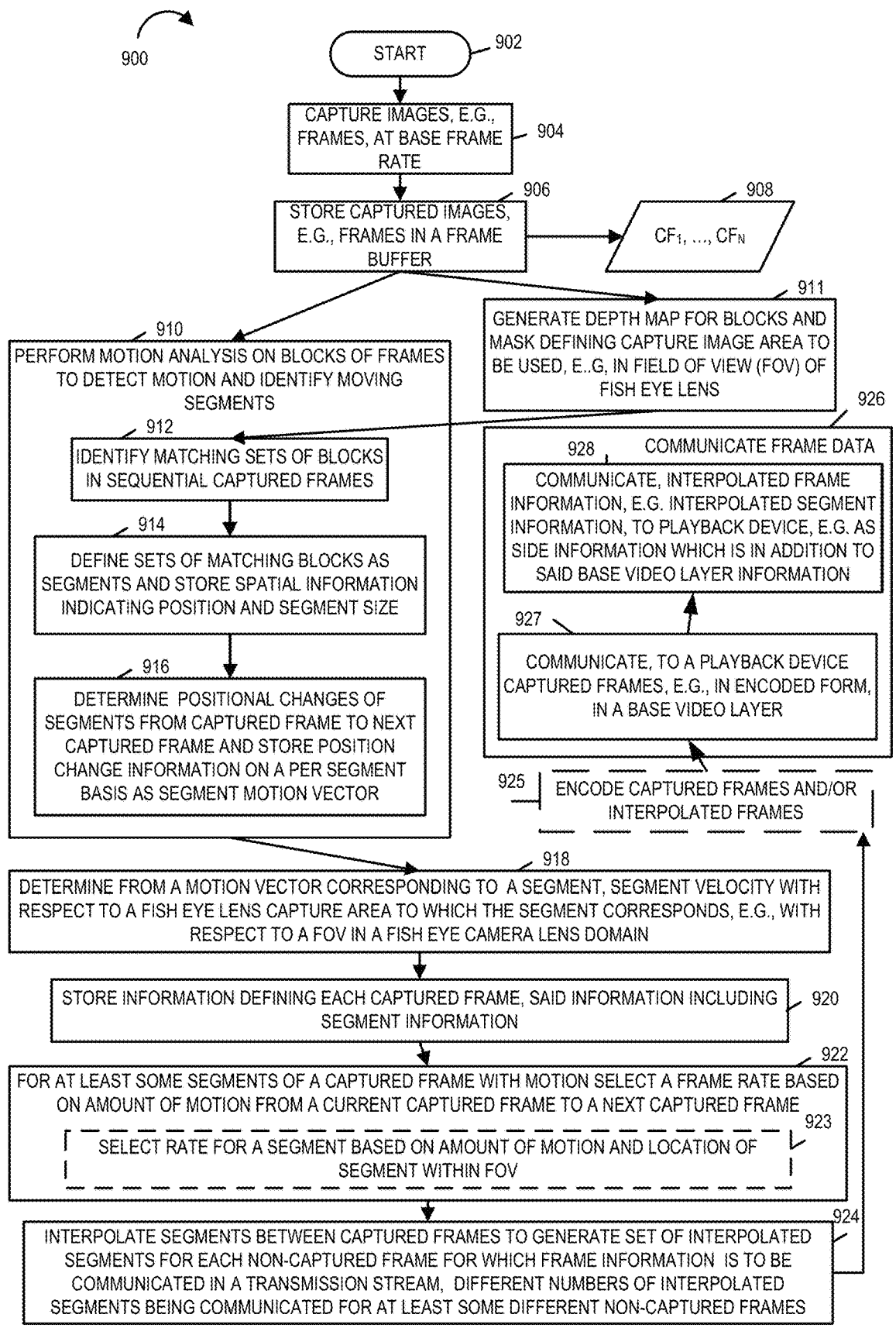
FIG. 9 shows a method of processing, captured image content in accordance with the invention which can and sometimes is implemented by the content delivery system shown in FIG. 1 and/or the image processing, calibration and encoding device of the content delivery system shown in FIG. 1.

FIG. 9 shows a method of capturing, processing and delivering captured image content along with interpolated content. The method shown in FIG. 9 can be implemented by the stereoscopic image capture system 102 working in combination with the content delivery system 104. The content delivery system is shown as a combination of a separate image processing device 112 and a content delivery device 114 in FIG. 1 but in some embodiments these components are implemented as a single device such as the content delivery system 700 shown in FIG. 2 which can and sometimes is used as the content delivery system 104 of FIG. 1. In some embodiments a processor 708 in the content delivery system is in communication with cameras, e.g., a left eye camera 1302 and a right eye camera 1304, of camera pairs and controls the cameras of one or more camera pairs to capture images of an environment at a first frame rate and to supply the captured images to the content delivery system 104 for processing. In some embodiments high resolution images are captured at a first frame rate but image content is supplied to playback devices 122, 126 to support a second, higher, frame rate with interpolation being performed by the content delivery system to generate the image data used to support the higher frame rate. This allows the cameras to be operated in a high resolution mode of operation where a high level of detail is captured but at a slower frame rate then might be possible if lower resolution images were captured by the cameras instead. The capture of high resolution content provides the detail which allows for a high quality virtual reality experience while interpolation facilitates the frame rate that allows for a realistic motion experience while 3D is supported.

The method 900 shown in FIG. 9 is implemented in some embodiments using the system shown in FIG. 1 with the content delivery system 700 of FIG. 2 being used in the system of FIG. 1 as the content delivery system 104 and with images being captured by the camera of the camera rig 102 which is sometimes implemented using the rig 1300 of FIG. 4, e.g, under the control of the content delivery system and/or a system operator.

In start step 902 the method 900 begins with the components of the system 100 being powered on, e.g., with the content delivery system 104 and the camera rig 102 being powered on and beginning operation. Operation proceeds from start step 902 to image capture step 904 in which the left and right cameras 1302, 1304 of a camera pair the camera rig 102 are used to capture images, e.g., left and right eye images respectively, at a first image capture rate and a first resolution. The first image resolution in some embodiments is a first maximum resolution supported by the cameras 1302, 1304 and the first image, e.g., frame, capture rate which is lower than a second image, e.g., frame, capture which the first and second cameras support when operating at a lower resolution. In this way the cameras are operated in at least some embodiments to maximize the level of detail captured albeit with the tradeoff that the image capture rate is lower than could be obtained using a lower image resolution.

Images 908 captured by the cameras in step 902 are stored in a frame buffer 715 in step 908 which may be and sometimes is included in the memory 712 of the content delivery system. The capture and storage may be and sometimes is performed on an ongoing basis as images of an ongoing event, a sporting event are captured and processed.

With high resolution images captured at the first frame rate and available for processing operation proceeds to step 910 in which motion analyses is performed on frames, e.g., captured frames in a video sequence, e.g., a sequence of left and/or right eye frames, to detect motion and identifying moving segments. In at least one such embodiments blocks are rectangular portions of a frame and segments are a set of one or move blocks. A segment may and sometimes does correspond to an object such as a ball which changes location, in time, in the environment such as a stadium or sports field where images of the environment are captured.

The motion analysis performed in step 910 allows image, e.g., frame, segments to be identified which might, and in some cases will, adversely affect a 3D playback experience if they are not updated during playback at a rate higher than the first frame rate. The processing in step 910 and the other steps of the flowchart 900 can be and in some embodiments are implemented by the processor 708 of the content delivery system and/or under the control of the processor 708 which controls the components of the system 100 to implement the steps of the method 900 shown in FIG. 9.

Step 910 includes in some embodiments one, more or all of steps 912, 914, 916. In step 912 captured images of a video sequence are analyzed to indentify matching sets of blocks, e.g., blocks of pixels corresponding to an object which appears in sequential frames of an image sequence, e.g., a left and/or right eye image sequence of frames. Then in step 914 identified matching sets of blocks are defined to be segments. In some such embodiments each segment is a set of physically adjacent blocks, e.g., a set of blocks corresponding to a physical object that moves in the environment where images are captured. Information about the position and size of the defined segment, e.g., object image, is stored in step 914 with the position information being stored on a per frame basis in at least some embodiments. In step 916 positional changes of segments from captures frames from one frame time to the next is determined and position change information is stored on a per segment, e.g., object, basis. The change information is in some embodiments stored as a motion vector indicating how a segment moved position from a previous frame, e.g., immediately preceding frame in a frame sequence. By analyzing the change in position of a segment corresponding to an object such as a ball in the frames over time, the movement of the segment from one frame time to the next can be determined as well as the location where the ball is in the environment as well as with respect to a camera lens used to capture the images of the environment. In step 916 segment definition and position change information is stored in some embodiments in portion 717 of memory 712. Motion vectors are determined for one or segments in step 916 can be and sometimes are used to generate interpolated frames.

With image segments having been defined and motion vectors for the segments having been generated that indicate segment motion between captured frames, operation proceeds from step 910 to step 918.

In step 918 a motion vector corresponding to a segment is considered and a segments velocity for the segments determined. Also determined it what portion of a fish eye lens of a camera used to capture the segment, the segment corresponds to. Determining the portion of a fish eye lens used to capture an image segment and how much the segment will move can be important since some portions of a fish eye lens curve more than others. Image segments which are likely to be captured by the same portion of a lens for an extended period of time are likely to suffer fewer lens introduced distortions between frame time than a segment which will move more in terms of the curvature of the lens area used to capture the image of the segment. Accordingly, step 918 allows for the effect of motion in combination with lens curvature effects to be taken into consideration when determining at what rate a segment should be presented to a user and thus what interpolation rate, if any, should be supported for a particular segment.

With the effect of fish eye lens FOV having been considered and quantified in terms of segment motion with respect to lens FOV operation proceeds from step 918 to step 920. In step 920 information defining each captured frame is stored with the information including segment information along with image pixel values. Also stored as part of the frame information are the pixel values representing the captured image. The frame information and data can be stored in frame buffer 715 and/or the segment portion of memory 717.

Operation proceeds from step 920 to step 922. In step 922 a frame rate is determined for at least some image segments based on the amount of motion of the segment or segments. The frame rate determination in some embodiments is made on a per segments basis. In some cases step 922 includes step 923 which involves making the segment frame rate determination based on not only the amount or rate of motion of the segments but also the location of the segment in the field of view for the time period to which the frame rate determination corresponds. In some cases different frame rates are determined for segments of the same size which correspond to different portions of the field of view. In some embodiments segments which change position with respect to a camera field of view corresponding to a more curved lens portion are given a higher frame rate than segments which change position in a FOV portion which corresponds to a less curved lens portion. In this way in at least some embodiments the effect of lens apparent affect distortions can be reduced by supporting a higher frame rate for segments which are more affected by the combination of motion and lens shape then segments which are less affected by the combination of motion and lens shape. In at least some cases the frame rate for segments subject to high motion is selected to be greater than the actual capture image frame rate. Segments which are not subject to motion or are subject to a rate of motion below a threshold, e.g., a predetermined or variable segment rate motion threshold used to control whether interpolation is performed for a segment, are determined to have a selected frame rate equal to the image capture rate, e.g., first frame rate and thus will not be interpolated. The interpolation segment motion threshold can and sometimes is varied depending on the amount of data, e.g., data rate, which can be used to communicate data to playback devices. Accordingly, a first higher threshold, and thus a higher rate of motion is required in some embodiments for segment interpolation to be implemented, for a first low level data rate used to communicate data to playback devices while a second lower threshold, and thus a lower rate of motion is required in some embodiments for segment interpolation to be implemented, for a second higher level data rate used to communicate data to playback devices.

With a frame rate having been determined for the identified image segments in step 922 and/or 923 operation proceeds to step 924. In step 924 segments are interpolated between captured frames to generate a set of interpolated segments for each non-captured frame for which frame information is to be communicated in a transmission stream with different numbers of interpolated segments being generated and communicated for at least some different interpolated, e.g., non-captured frames.

By making decisions as to what segments to interpolate prior to transmission to the playback device the frame rate to be supported and which segments are to be interpolated for a particular frame time can be made using information which is normally not available to a playback device such as information about the shape of the camera lenses used to capture images and where a segment falls with respect to the camera lens field of view (FOV). In addition, relatively powerful processing resources are normally available in the distribution system as compared to at the playback device. This is because the distribution system can perform the interpolation and encoding of content for multiple devices allowing for a relatively powerful and costly processor or set of processor to be used to support distribution. Given that playback devices are often owned by individual customer's their cost, and corresponding processing power, is often much less than that of the distribution system. In fact, in many cases playback devices may find normal decoding and display of left and right eye image content to support a 3D virtual reality experience computationally taxing even without supporting interpolation between captured frames. Thus for a variety of reasons there are benefits to shifting interpolation related decisions and processing to the distribution side as opposed to the playback side. Furthermore, by using interpolation in accordance with the invention, the distribution system can delivering frames at a higher frame rate than the image capture rate allowing for a more pleasing and realistic viewing experience than if the image capture resulting was reduced and detail needed for a realistic 3D experience was lost or the changes between frames due to motion was allowed to be excessively large.

In step 924 segment are interpolated to support the frame rate selected for the segment in step 922. Thus segments for which different frame rates were selected, i.e., determined, in steps 922 different frame rates were determined, i.e., selected in step 920 will be interpolated at their different corresponding frame rates. Segments for which the image capture rate was selected will not be subject to interpolation. The interpolated image data is used as interpolated frame information. The interpolated frame information is often much smaller, e.g., less than ½oth or in some cases less than ½ooth of the amount of data used to used to represent a captured image frame. Thus, in at least some cases, the interpolated frame information can be communicated to a playback device without having a major impact on the overall amount of data transmitted. Interpolated frame information can include interpolated segments, communicated as intra-frame coded image data and/or inter-frame coded image data. Interpolated frame information that is generated in step 924 may and sometimes also does include fill information which provides instructions to a playback device where to obtain missing frame information and/or how to fill a portion of an interpolated frame which may, without a fill operation, have a gap due to the motion of segment relative to a preceding frame. In various embodiments fill image data is obtained from a preceding or subsequent frame in some embodiments. The filled portion may be a portion of an environment which did not move but which was obscured by the object which did move. Such fill data may be obtained from a frame that is one or more captured frame times away from the interpolated frame time.

With interpolated segment and/or other interpolated frame data having been generated in step 924 operation proceeds to encoding step 925, in embodiments where encoding of frames is performed, or directly to communication step 926. In step 926 captured frame data and interpolated frame data is communicated to at least one playback device, e.g., after storage in the memory 700 of the content delivery system.

In step 925, when used, the captured frames and/or interpolated frames are encoded. MPEG or other image encoding content can be used to encode the captured image frames. In some embodiments left and right eye image data corresponding to a frame time is incorporated into a single frame for encoding purposes while in other embodiments left and right eye image data is encoded as separate image streams and/or as interleaved image stream.

Intra-frame and/or Intra frame coding techniques can be and sometimes are used to encode the captured and interpolated frames.

It should be appreciated that the captured frames and interpolated frames can be delivered to a playback device in encoded or unencoded form. In most embodiments encoding of the captured image frames which form what can be considered a base view layer is implemented along with the encoding of interpolated frames. In step 925 encoding of the frame information to be stored and transmitted to a playback device is implemented. Then in step 926 frame data is communicated to a playback device. Step 926 includes steps 927 and 928 in some embodiments. The captured frame data, e.g., captured frames, are communicated to a playback device, e.g., in encoded form in the case where encoding is used and in uuencoded form when encoding step 925 is not used. The captured frames form, in some embodiments a base video layer which is communicated in step 927. In step 928 interpolated frame information is communicated to the playback device. The interpolated frame information may include encoded interpolated frames which communicate the interpolated segments and/or fill information that can be used to construct a complete interpolated frame. Motion vectors included in the interpolated frame information in some cases indicate where in a captured frame, and in some cases another interpolated frame, segment content to be included in the interpolated frame can be found and the distance the content is to be moved from its original location in the source frame to form part of an interpolated frame. Thus the motion vector corresponding to a segment of an interpolated frame can and sometimes does indicate the source of the segment image content to be included in an interpolated frame to be generated using a segment motion vector and the location in the frame where the segment is to be positioned.

In other embodiments the interpolated frame information is communicated as segment motion vectors and/or other information on how to construct the remainder of the interpolated frames from one or more other frames, e.g., preceding or subsequent frames from which fill content is obtained and placed at locations in the interpolated frame being generated with the location of placement being specified by information in the interpolated frame information.

While various figures show a transmission order which matches the intended frame display order, it should be appreciated that the actual transmission order may vary with buffering and reordering of transmitted frames being implemented by both the content delivery system and the playback system. In such cases if the content delivery system reorders captured and interpolated frames for transmission the playback device will undue and restore the frames to the proper display order prior to display.

While flow chart 900 ends with step 928 it should be appreciated that the capture, processing and transmission of content can be performed on an ongoing basis or for some period of time, e.g., corresponding to an event. Thus the steps of the method 900 are performed over and over as new content, e.g., images of an environment, are captured, processed and stored for future transmission or communicated to one or more playback systems.

Figure 10:
FIG. 10 is a diagram showing how the transmitted frame rate, that is generated and by the content delivery system exceeds the captured frame rate in various embodiments of the invention.

It should be appreciated that in accordance with the method of FIG. 9, content, including captured images, e.g., frames, and interpolated frame data, e.g., interpolated frames, are communicated in some embodiments to one or more playback systems 101, 111 for decoding and display, e.g., as part of a virtual reality experience in which separate left and right eye images are presented to a user to provide a 3D experience. FIG. 10 is a diagram 1000 showing how the transmitted frame rate (TFR) 1002, that is generated and by the content delivery system 104 exceeds the captured frame rate (CFR) in various embodiments of the invention.

Figure 11:
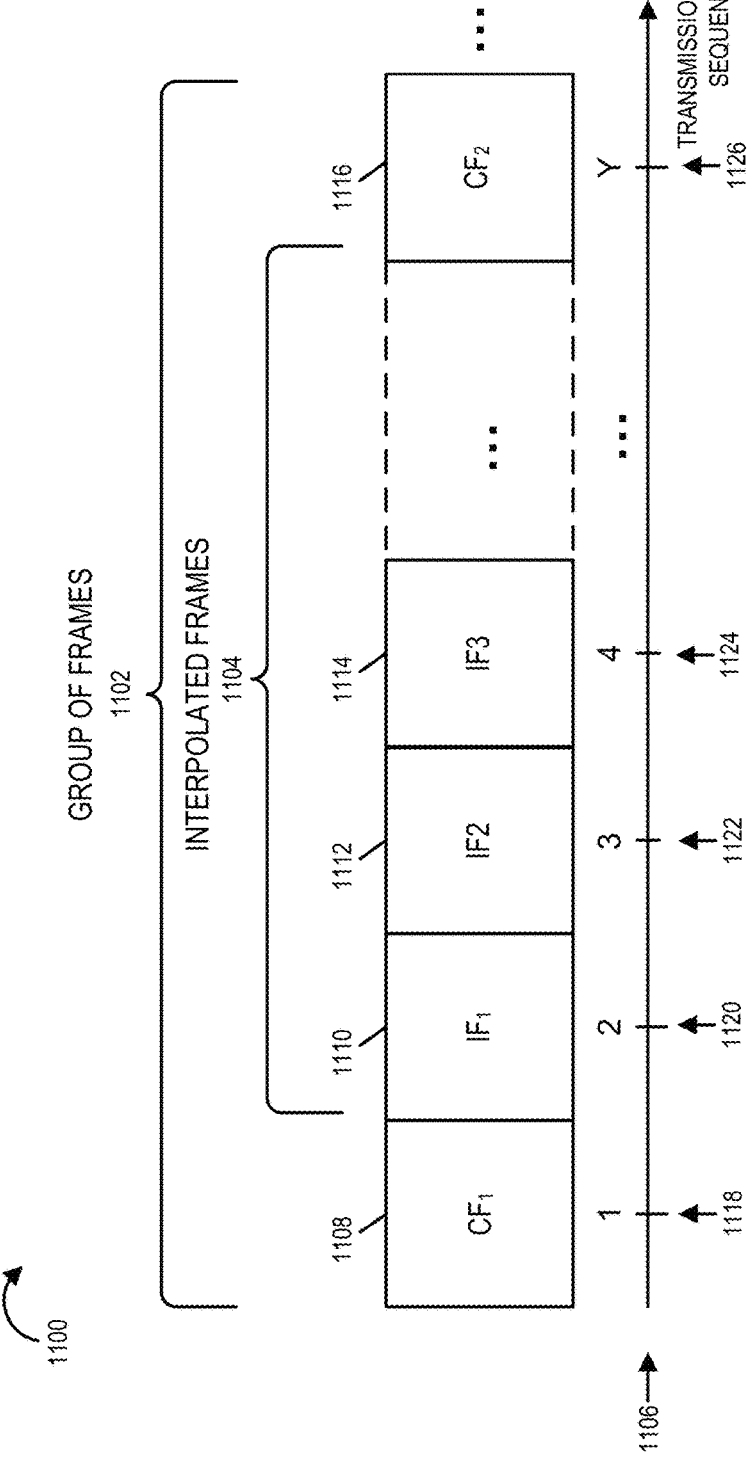
FIG. 11 shows an exemplary overall transmission frame sequence with CF begin used to indicate a captured frame that is communicated, e.g., as part of a base video layer, and IF being used to indicate interpolated frame information communicated in some embodiments as an enhancement layer with each set of interpolated frame information including one or more segments, e.g., generated through the use of motion interpolation.

FIG. 11 shows an exemplary overall transmission frame sequence 1100 with CF being used to indicate a captured frame that is communicated, e.g., as part of a base video layer, and IF being used to indicate interpolated frame information communicated in some embodiments as an enhancement layer with each set of interpolated frame information including one or more segments, e.g., generated through the use of motion interpolation. Line 1106 is used to indicate transmission frame sequence number. Exemplary group of frames 1102 includes a first captured frame, which is captured frame 1 (CF1 1108), followed by a plurality of interpolated frames 1104 (interpolated frame 1 (IF1) 1110, interpolated frame 2 (IF2) 1112, interpolated frame 2 (IF3) 1114, . . . ), followed by a second captured frame (CF2) 1116. CF1 1008 corresponds to transmission frame sequence number 1; IF1 1110 corresponds to transmission frame sequence number 2; IF2 1112 corresponds to transmission frame sequence number 2; IF3 1114 corresponds to transmission frame sequence number 4, and CF2 1116 corresponds to transmission frame sequence number Y, e.g., where Y=the number of interpolated frames in the group of frames 1104+2.

Figure 12:
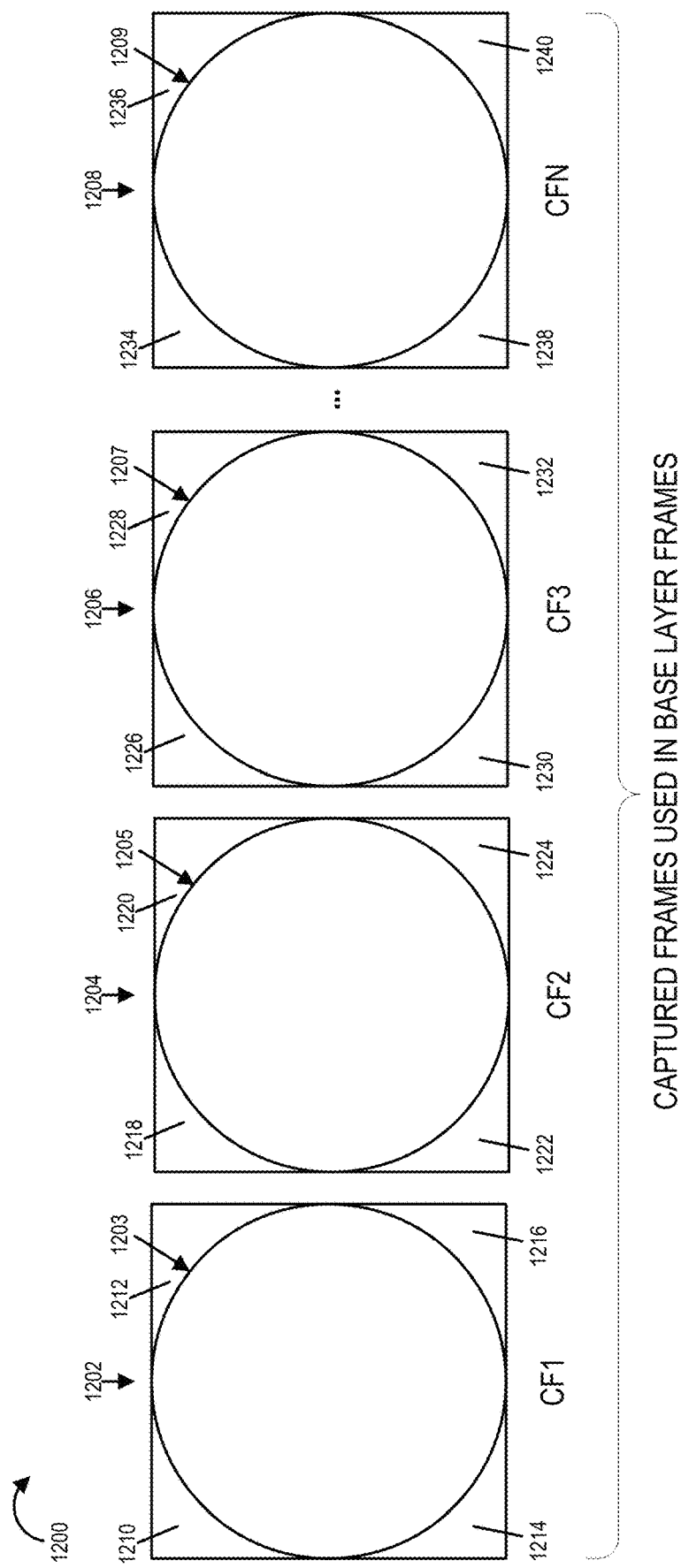
FIG. 12 shows captured frames used as base layer frames with the circle corresponding to the portion of the frame which includes image content corresponding to the fish eye lens used to capture the image with the edge portions outside the circle not being of interest in some embodiments since they will not be used as textures and correspond to areas outside captured scene area of interest.

FIG. 12 is a drawing 1200 which shows captured frames (captured frame 1 (CF1) 1202, captured frame 2 (CF2) 1204, captured frame 3 (CF3) 1206, . . . , captured frame N (CFN) 1208) used as base layer frames with the circle (1203, 1205, 1207, . . . , 1209), corresponding to the portion of the frame (CF1 1202, CF2 1204, CF3, 1206, . . . , CFN 1208), respectively, which includes image content corresponding to the fish eye lens used to capture the image with the edge portions ((1210, 1212, 1214, 1215), (1218, 1220, 1222, 1224), (1226, 1228, 1230, 1232), . . . , (1234, 1236, 1238, 1240)) outside the circle (1203, 1205, 1207, . . . , 1209), respectively, not being of interest in some embodiments since they will not be used as textures and correspond to areas outside captured scene area of interest.

Figure 13:
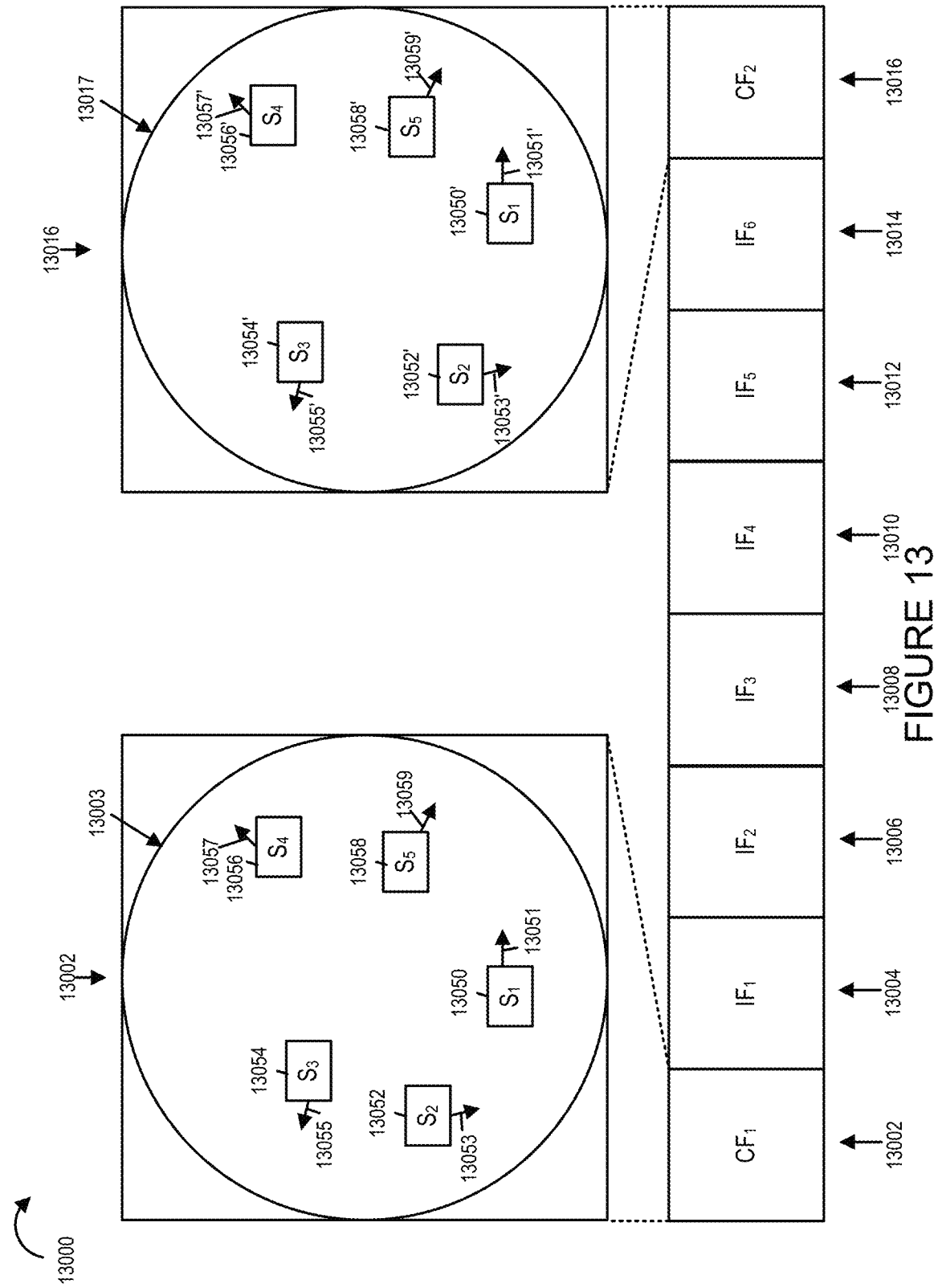
FIG. 13 shows how information for reconstructing particular segments may be sent as interpolated frame data.

FIG. 13 includes drawing 13000 which shows how information for reconstructing particular segments may be sent as interpolated frame data. Note that information for different segments may be communicated at different frame rates with updated segment information for some segments being omitted for some interpolated frame times and frame sets. The position to which the segment corresponds with regard to the fish eye lens capturing the image and the direction of motion of the object in the segment as represented by the direction arrow may be and sometimes is taken into consideration when determining the frame rate of the individual segment. Segment information is sent as supplemental information and is sometimes referred to as side information since it is sent in addition to the base video frame layer information. Segment information for interpolated frames is generated by using motion interpolation prior to encoding and transmission to the playback device in some embodiments.

Drawing 13000 includes a group of frames including capture frame 1 (CH) 13002, six interpolated frames (IF1 13004, IF2 13006, IF3 13008, IF4 13010, IF5 13012, IF6 13014) and capture frame 2 (CF1) 13016. Five exemplary segments of interest (segment 1 (S1) 13050, segment 1 (S2) 13052, segment 3 (S3) 13054, segment 4 (S4) 13056, segment 5 (S5) 13058) are identified within the image capture area 13003 of captured frame 1 (CH) 13002. The direction of motion of the object in each segment (S1 13050, S2 13052, S3 13054, S4 13056, S5 13058) are represented by the direction arrows (13051, 13053, 13055, 13057, 13059), respectively.

Five exemplary segments (segment 1 (S1) 13050', segment 1 (S2) 13052', segment 3 (S3) 13054', segment 4 (S4) 13056', segment 5 (S5) 13058'), are identified within the image capture area 13017 of captured frame 2 (CF2) 13016. Exemplary segment 1 (S1) 13050' of CF2 13016 includes the same object as segment 1 (S1) 13050 of CF1 13002. Exemplary segment 2 (S2) 13052' of CF2 13016 includes the same object as segment 2 (S2) 13052 of CF1 13002. Exemplary segment 3 (S3) 13054' of CF2 13016 includes the same object as segment 3 (S3) 13054 of CF1 13002. Exemplary segment 4 (S4) 13056' of CF2 13016 includes the same object as segment 4 (S4) 13056 of CF1 13002. Exemplary segment 5 (S5) 13058' of CF2 13016 includes the same object as segment 5 (S5) 13058 of CF1 13002.

The direction of motion of the object in each segment (S1 13050', S2 13052', S3 13054', S4 13056', S5 13058') are represented by the direction arrows (13051', 13053', 13055', 13057', 13059'), respectively.

Figure 14:
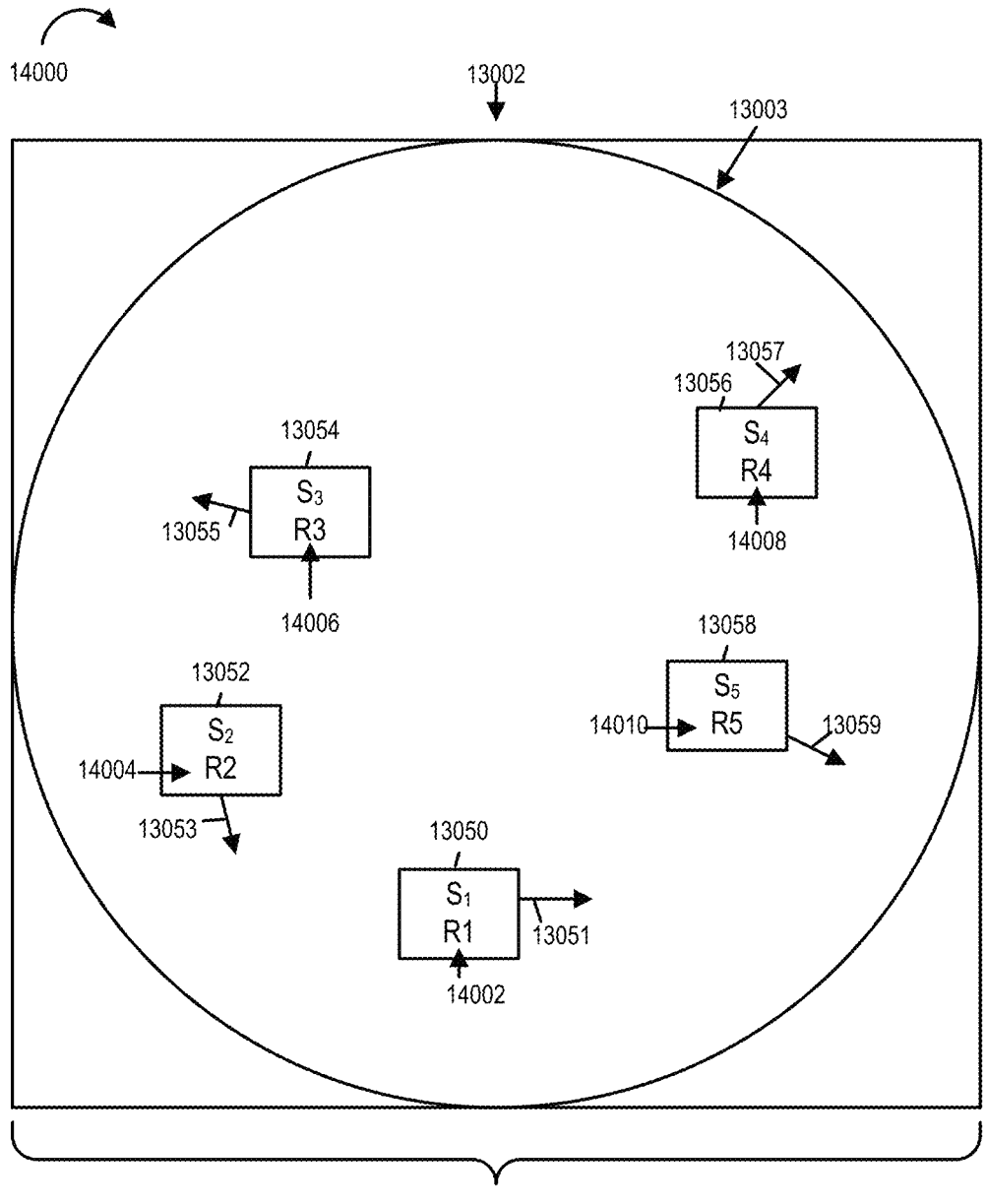
FIG. 14 shows how velocity vectors and the various rates along with the position with respect to the fish eye lens capture area can be considered for determining the frame rate that should be supported via interpolation.

FIG. 14 is a drawing 14000 which shows how velocity vectors and the various rates along with the position with respect to the fish eye lens capture area (13003) can be considered for determining the frame rate that should be supported via interpolation. FIG. 14 shows identified motion segments (S1 13050, S2 13052, S3 13054, S4 13056, S5 13058) with determined corresponding velocity vectors (13051, 13053, 13055, 13057, 13059), respectively. Selected rates (R1 14002, R2 14004, R3 14006, R4 14008, R5 14010) to be used for interpolation are based on the determined velocity vectors (13051, 13053, 13055, 13057, 13059), respectively, and on the location of the segments (S1 13050, S2 13052, S3 13054, S4 13056, S5 13058), respectively, in the field of view 13003 of the captured frame 13002.

Figure 15:
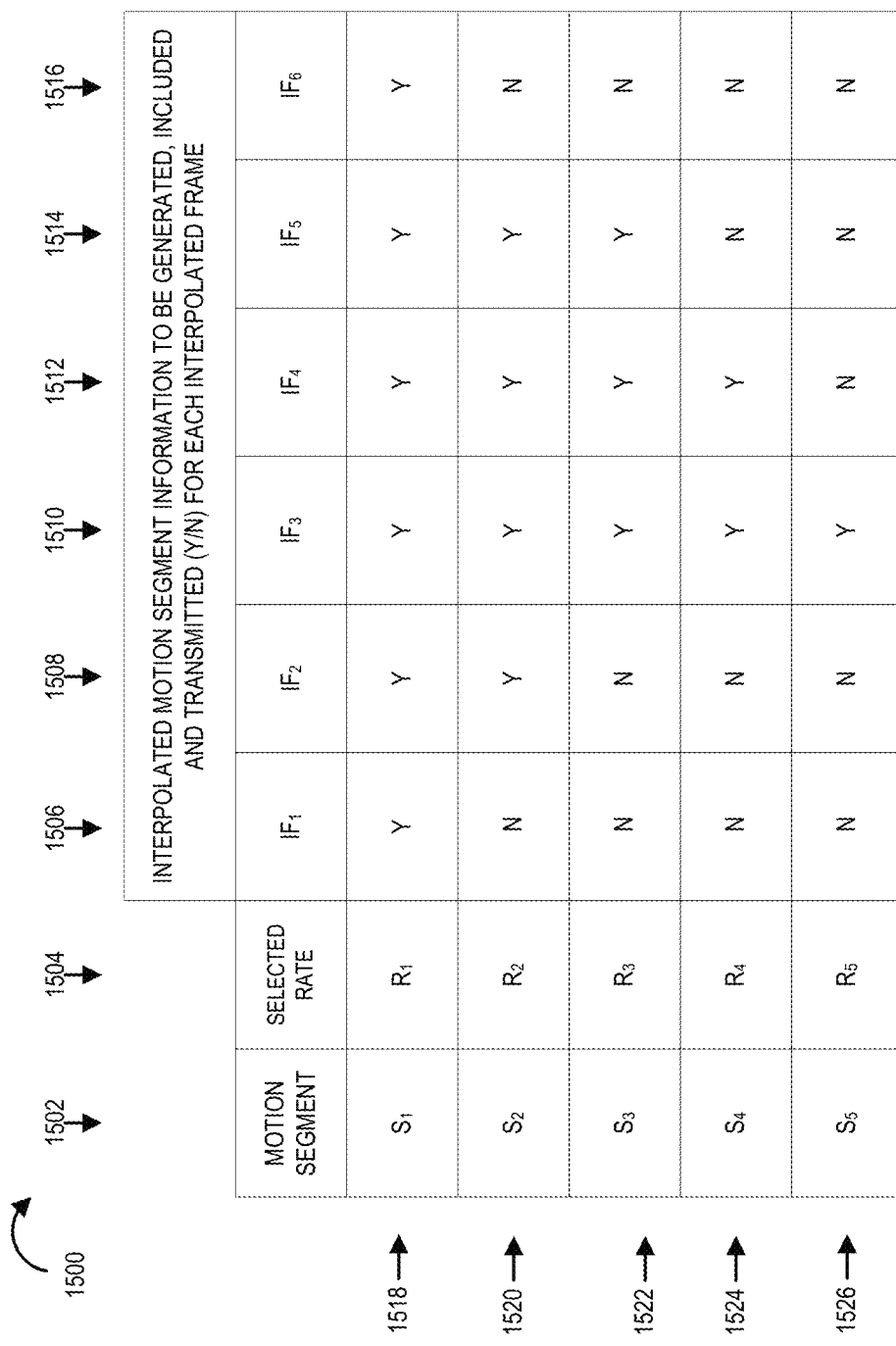
FIG. 15 is a chart showing various interpolated frame times and which segments will be interpolated and communicated based on the selected frame rate to be supported for the particular segment.

FIG. 15 is a chart 1500 showing various interpolated frame times and which segments will be interpolated and communicated based on the selected frame rate to be supported for the particular segment. Note that for different segments different frame rates will be supported with a Y indicating that information will be included for the segment and N indicating that for the given frame time listed in the top row interpolated information will not be generated and communicated as side information. Note that the number subscripts are used after IF to indicate the interpolated frame to which the frame information relates. For example IF1 corresponds to interpolated frame 1, IF2 corresponds to interpolated frame 2.

First column 1502 includes information identifying the motion segment for each row of the table. Second column 1504 includes information identifying the selected rate for interpolation for each of the motion segments. Third column 1508 includes information indicating if interpolated information for a motion segment is to be generated, included and transmitted for interpolated frame IF1. Fourth column 1510 includes information indicating if interpolated information for a motion segment is to be generated, included and transmitted for interpolated frame IF2. Fifth column 1512 includes information indicating if interpolated information for a motion segment is to be generated, included and transmitted for interpolated frame IF3. Fifth column 1514 includes information indicating if interpolated information for a motion segment is to be generated, included and transmitted for interpolated frame IF5. Sixth column 1516 includes information indicating if interpolated information for a motion segment is to be generated, included and transmitted for interpolated frame IF6.

Row 1518 includes information identifying that for motion segment S1, the selected rate is R1 and interpolated information for motion segment S1 is to be generated, included and transmitted for each of the interpolated frame IF1, IF2, IF3, IF4, IF5, and IF6.

Row 1520 includes information identifying that for motion segment S2, the selected rate is R2 and interpolated information for motion segment S2 is to be generated, included and transmitted for each of the interpolated frames IF2, IF3, IF4, and IF5, but not for interpolated frames IF1 and IF6.

Row 1522 includes information identifying that for motion segment S3, the selected rate is R3 and interpolated information for motion segment S3 is to be generated, included and transmitted for each of the interpolated frames IF3, IF4, and IF5, but not for interpolated frames IF1, IF2, and IF6.

Row 1524 includes information identifying that for motion segment S4, the selected rate is R4 and interpolated information for motion segment S4 is to be generated, included and transmitted for each of the interpolated frames IF3, IF4, but not for interpolated frames IF1, IF2, IF5, and IF6.

Row 1526 includes information identifying that for motion segment S5, the selected rate is R5 and interpolated information for motion segment S4 is to be generated, included and transmitted for interpolated frames IF3, but not for interpolated frames IF1, IF2, IF4, IF5, and IF6.

Set forth below are lists of numbered exemplary embodiments. The numbering in each list is used to refer to the embodiments included in the list in which the numbering is used.

First List of Numbered Method Embodiments

Method Embodiment 1 A content distribution method, the method comprising: storing (908) images (751) that were captured at a first frame rate, performing interpolation (924) to generate interpolated frame data to support a second frame rate which is higher than said first frame rate; and communicating (926) captured frame data and interpolated frame data to at least one playback device.

Method Embodiment 2 The method of Method Embodiment 1, where said first frame rate is a highest frame rate supported by a camera used to capture images while said camera is operating at maximum image capture resolution.

Method Embodiment 3 The method of Method Embodiment 1, further comprising: operating a camera of a first camera of a camera pair to capture said images at the first rate.

Method Embodiment 4 The method of Method Embodiment 3, wherein the first camera supports a higher frame rate which is higher than said first frame rate when capturing images at a lower resolution.

Method Embodiment 5 The method of Method Embodiment 1, wherein communicating captured frame data includes communicating captured frames at a first data rate which corresponds to an image capture rate.

Method Embodiment 6 The method of Method Embodiment 5, wherein the combination of captured frame data and interpolated frame data correspond to a second frame rate to be used by the playback device for displaying images.

Method Embodiment 7 The method of Method Embodiment 6 wherein said second frame rate is a stereoscopic frame rate at which left and right eye images are displayed to a user of the playback device to support a 3D viewing experience.

Method Embodiment 7A The method of Method Embodiment 7, wherein the interpolated frame data communicates interpolated frames which increase supplement the captured frames to thereby increase the frame rate from the captured frame rate to the second frame rate.

Method Embodiment 8 The method of Method Embodiment 1, further comprising: performing (910) motion analysis on blocks of captured frames to detect motion and identify moving segments; selecting (922), for at least a first segment, a frame rate based on an amount of motion of the first segment from a current captured frame and one or more other captured frames (e.g., at least a next captured frame); and wherein performing interpolation (924) to generate interpolated frame data includes interpolating segments between captured frames to generated interpolated frame information.

Method Embodiment 9 The method of Method Embodiment 8, wherein said at least one segment is an image segments of a moving object.

Method Embodiment 9A The method of Method Embodiment 8, wherein said moving object is a ball.

Method Embodiment 10 The method of Method Embodiment 8, wherein interpolating segments includes interpolating versions of said first segment to support said selected frame rate.

Method Embodiment 11 The method of Method Embodiment 8, further comprising: communicating (926) captured frames to a playback device as part of a base video layer; and communicating (928) information corresponding to one or more interpolated segments corresponding to an interpolated frame time as part of additional video information.

Method Embodiment 11A The method of Method Embodiment 8 wherein said base video layer includes 3D video information in the form of multiple left and right eye captured frames.

Method Embodiment 11B The method of Method Embodiment 11A, wherein communicating (926) captured frame data includes communicating multiple captured frames in encoded form in said base video layer, said video base layer having the first frame rate.

Method Embodiment 11C The method of Method Embodiment 11B, wherein said 3D video information includes left and right eye information for each frame time corresponding to the base video layer.

First Numbered List of System Embodiments

System Embodiment 1 An image capture and processing system, comprising: at least a first camera (1302) for capturing (904) images at a first frame rate; and a content delivery system (700) including: a memory (712); and a processor (708) coupled to said memory, the processor being configured to control the content delivery system to: perform interpolation (924) on captured frames to generate interpolated frame data to support a second frame rate which is higher than said first frame rate; and communicate (926) captured frame data and interpolated frame data to at least one playback device.

System Embodiment 2 The image capture and processing system of System Embodiment 1, where said first frame rate is a highest frame rate supported by a camera used to capture images while said camera is operating at maximum image capture resolution.

System Embodiment 3 The image capture and processing system of System Embodiment 1, wherein the first camera captures images at the first frame rate is performed by a first camera of a camera pair.

System Embodiment 4 The image capture and processing system of System Embodiment 3, wherein the first camera supports a higher frame rate which is higher than said first frame rate when capturing images at a lower resolution.

System Embodiment 5 The image capture and processing system of System Embodiment 1, wherein the processor controls the content delivery system, as part of communicating captured frame data to: communicate captured frames at a first data rate which corresponds to an image capture rate.

System Embodiment 6 The image capture and processing system of System Embodiment 5, wherein the combination of captured frame data and interpolated frame data correspond to a second frame rate to be used by the playback device for displaying images.

System Embodiment 7 The image capture and processing system of System Embodiment 6 wherein said second frame rate is a stereoscopic frame rate at which left and right eye images are displayed to a user of the playback device to support a 3D viewing experience.

System Embodiment 7A The image capture and processing system of System Embodiment 7, wherein the interpolated frame data communicates interpolated frames which increase supplement the captured frames to thereby increase the frame rate from the captured frame rate to the second frame rate.

System Embodiment 8 The image capture and processing system of System Embodiment 1, wherein the processor (708) is further configured to control the content delivery system to: perform (910) motion analysis on blocks of captured frames to detect motion and identify moving segments; select (922), for at least a first segment, a frame rate based on an amount of motion of the first segment from a current captured frame and one or more other captured frames (e.g., at least a next captured frame); and wherein performing interpolation (924) to generate interpolated frame data includes interpolating segments between captured frames to generated interpolated frame information.

System Embodiment 9 The image capture and processing system of System Embodiment 8, wherein said at least one segment is an image segments of a moving object.

System Embodiment 9A The image capture and processing system of System Embodiment 8, wherein said moving object is a ball.

System Embodiment 10 The image capture and processing system of System Embodiment 8, wherein interpolating segments includes interpolating versions of said first segment to support said selected frame rate.

System Embodiment 11 The image capture and processing system of System Embodiment 8, wherein the processor (708) is further configured to control the content delivery system to, as part of communicating (926) captured frame data and interpolated frame data to at least one playback device: communicate (926) captured frames to a playback device as part of a base video layer; and communicate (928) information corresponding to one or more interpolated segments corresponding to an interpolated frame time as part of additional video information.

System Embodiment 11A The image capture and processing system of System Embodiment 8 wherein said base video layer includes 3D video information in the form of multiple left and right eye captured frames.

System Embodiment 11B The image capture and processing system of System Embodiment 11A, wherein communicating (926) captured frame data includes communicating multiple captured frames in encoded form in said base video layer, said video base layer having the first frame rate.

System Embodiment 11C The image capture and processing system of System Embodiment 11B, wherein said 3D video information includes left and right eye information for each frame time corresponding to the base video layer.

First Numbered List of Computer Readable Medium Embodiments

Computer Readable Medium Embodiment 1 A non-transitory computer readable medium including computer executable instructions which when executed by a processor (706) of a content delivery system (700) cause the processor to control the content delivery system (700) to: access images (751) stored in memory (712) of the content delivery system (700), said images having been captured by a camera (1302) at a first frame rate; perform interpolation (924) to generate interpolated frame data to support a second frame rate which is higher than said first frame rate; and communicate (926) captured frame data and interpolated frame data to at least one playback device.

Second List of Numbered Method Embodiments

Method Embodiment 1. A method of operating a playback system (300), the method comprising: receiving (1603) captured frame data and interpolated frame data; recovering (1607) captured frames from the received captured frame data; generating (1610) one or more interpolated frames from received interpolated frame data; rendering (1618) a video sequence including one or more captured frames and at least one interpolated frame; and outputting (1620) one or more rendered images to a display device (702).

Method Embodiment 2. The method of Method Embodiment 1, wherein said captured frames corresponding to a first frame rate; and wherein said generated video sequence including the captured frames and one or more interpolated frames has a second frame rate which is higher than said first frame rate.

Method Embodiment 3. The method of Method Embodiment 2, wherein outputting (1620) one or more rendered images to a display device (702) includes outputting rendered image portions at the second frame rate.

Method Embodiment 4. The method of Method Embodiment 3, wherein said second frame rate matches a display refresh rate supported by said display device (702); and wherein said display device is a head mounted display device.

Method Embodiment 5. The method of Method Embodiment 1, wherein said second frame rate is a frame rate that is higher than an image capture rate used to capture images received by the playback system.

Method Embodiment 6. The method of Method Embodiment 5, wherein said playback system does not interpolate between received frames to increase the frame output rate beyond a received frame rate.

Method Embodiment 7. The method of Method Embodiment 2, wherein generating (1610) one or more interpolated frames from received interpolated frame data includes: using (1612) a motion vector to generate a portion of a first interpolated frame from a first captured frame; and using (1614) content from one or more preceding frames to fill an area of the first interpolated frame for which interpolated segment data is not provided.

Second Numbered List of System Embodiments

System Embodiment 1. A playback system (300), the method comprising: a display device (805); a network interface (810) receiving (1603) captured frame data and interpolated frame data; and a processor (808) configured to control the playback system to: recover (1607) captured frames from the received captured frame data; generate (1610) one or more interpolated frames from received interpolated frame data; render (1618) a video sequence including one or more captured frames and at least one interpolated frame; and output (1620) one or more rendered images to a display device (702).

System Embodiment 2. The playback system (300), of System Embodiment 1, wherein said captured frames corresponding to a first frame rate; and wherein said generated video sequence includes the captured frames and one or more interpolated frames has a second frame rate which is higher than said first frame rate.

System Embodiment 3. The playback system (300) of System Embodiment 2, wherein outputting (1620) one or more rendered images to a display device (702) includes outputting rendered image portions at the second frame rate.

System Embodiment 4. The playback system (300) of System Embodiment 3, wherein said second frame rate matches a display refresh rate supported by said display device (702); and wherein said display device is a head mounted display device.

System Embodiment 5. The playback system (300) of System Embodiment 1, wherein said second frame rate is a frame rate that is higher than an image capture rate used to capture images received by the playback system.

System Embodiment 6. The playback system (300) of System Embodiment 5, wherein said playback system does not interpolate between received frames to increase the frame output rate beyond a received frame rate.

System Embodiment 7. The playback system (300) of System Embodiment 2, wherein the process if configured, as part of generating (1610) one or more interpolated frames from received interpolated frame data to: use (1612) a motion vector to generate a portion of a first interpolated frame from a first captured frame; and use (1614) content from one or more preceding frames to fill an area of the first interpolated frame for which interpolated segment data is not provided.

Second Numbered List of Computer

Readable Medium Embodiments

Computer readable medium embodiment 1. A non-transitory computer readable medium including computer executable instructions (814) which when executed by a processor (808) of a content playback system (300) cause the processor to control the content delivery system (700) to: receive (1603) captured frame data and interpolated frame data; recover (1607) captured frames from the received captured frame data; generate (1610) one or more interpolated frames from received interpolated frame data; render (1618) a video sequence including one or more captured frames and at least one interpolated frame; and output (1620) one or more rendered images to a display device (702).

One goal of immersive VR experiences is to deliver a realistic experience. To achieve this goal, content that a user consumes should adhere to very high quality norms. In particular, high action content such as sports is extremely sensitive to motion fidelity. Any issues with motion capture, processing, transmission, playback and rendering have to be addressed in an appropriate manner. Various factors such as content capture system, encoding and playback and display refresh frame rates affect motion fidelity. In particular, high resolution fast motion immersive content, in certain conditions, causes motion blur, strobing and stuttering artifacts when the captured and rendered frame rates are below the device/HMD display refresh rates.

Various embodiments are directed to methods and/or apparatus which take into consideration one, more or all of the above discussed factors and which support dynamic processing of content, in order to achieve good fidelity in content which is communicated and played back to a user of a virtual reality device. Various features relate to motion segmentation, depth analysis and estimation that is performed on captured images and take into account the amount of motion in each temporal segment, e.g., set of 3D image content corresponding to a time period, and allocates a frame rate to provide a sense of smooth motion given the amount of motion of objects detected in the captured frames corresponding to a period of time including multiple frames, e.g. 2, 15, 30 or more sequentially captured frames.

In various embodiments the use of fish eye lens based image capture is taken into consideration. The motion trajectory of an object or portion of content is considered with respect to the curvature of the fish eye lens. A mapping function takes into consideration the rate of change of the real world display size and movement in the 3D spherical domain as perceived by the fish eye lens used to capture images, e.g., of a live scene such as a field where a sports event is ongoing.

In 3D implementation the method process and operates on stereo images, e.g., pairs of left and right eye images. Given the stereo nature and the capture of image for both left and right eyes, the selection of a desirable frame rate, different from the capture rate based on motion and stereo related issues, can result in reduced computation, bandwidth and processing as compared to systems which capture, encode and transmit images at a fixed rate irrespective of motion or 3D issues. In various embodiments image capture, processing, encoding and communication are performed in real-time, e.g., while a sporting or other event where images are being captured is still ongoing.

In various embodiments images are captured at a lower rate than the rate at which a playback device generates and displays images to a user of the playback device. The playback device may be and sometimes is a virtual reality system including a processor and head mounted display which in some embodiments can display different image content to a user's left eye and right eye. In at least some embodiments, captured image content is analyzed and a determination is made with regard to a frame rate to use for communication of frames to the playback device. The determined frame rate, intended in many cases to give the user a sense of smooth motion, is often higher than the image capture rate. Interpolation of captured images is used to generate a complete set of frames corresponding to the determined frame rate. The rate at which particular segments, which sometimes correspond to moving objects, are communicated to the playback device is selected based on the amount of motion the segment/object exhibits and/or the portion of the fish eye lens of the camera device used to capture the segment. In various embodiments segments subject to a high rate of motion/change are encoded and communicated at a different rate than segments which are relatively static.

In various embodiments images are captured, e.g., at a high resolution but at a lower image capture rate than the frame playback rate implemented by the virtual reality playback device. Frames are interpolated between the captured frames to take into consideration motion of objects. The interpolation process is able to use the full set of captured image content since the interpolation process is performed prior to lossy encoding and transmission to the playback device. Thus the system processing the captured images has more information available to it than the playback device which normally receives compressed image data and images that have been degraded by compression. It should be appreciated that the system that generates content to be communicated to playback devices may also have one or more processors which can perform interpolation operations prior to encoding. The encoding than can take into consideration the differences between the encoded set of frames to be communicated to the playback device and the movement or change from one frame to the next.

In some systems which use the invention fish eye lenses are used to capture image content to be communicated to the playback devices. Fish eye lenses tend to distort the image being captured. In some but not necessarily all embodiments the location of motion with respect to what portion of a fish eye lens is used to capture the image content corresponding to the motion is taken into consideration for encoding purposes, e.g., when deciding what portions of captured frames or frames generated by interpolation should be communicated to a playback device.

Figure 16:
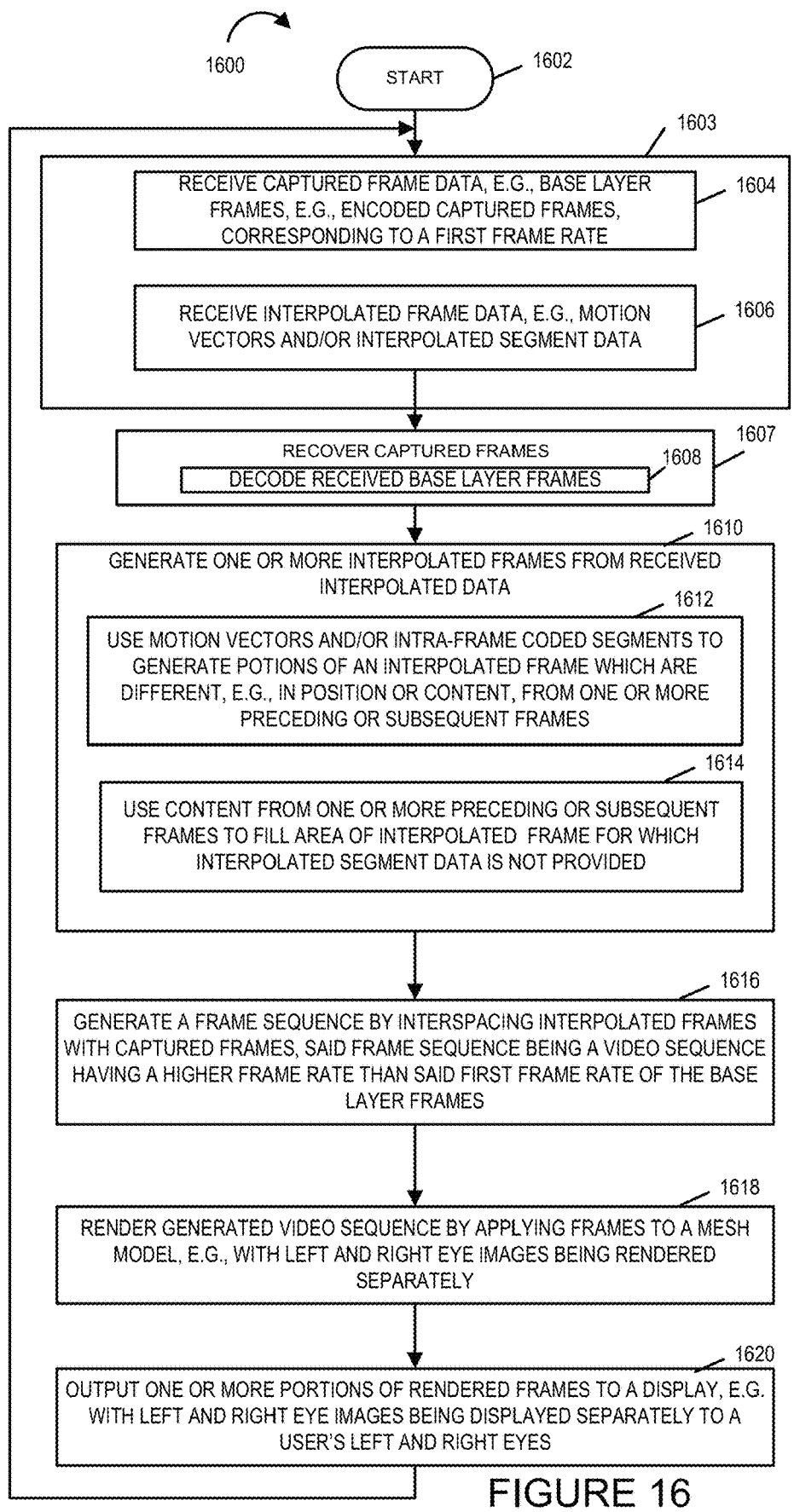
FIG. 16 is a flowchart of an exemplary playback method in accordance with an exemplary embodiment.

FIG. 16 illustrates a playback method 1600 which maybe and in some embodiments is implemented by one of the playback systems of FIG. 1. In some embodiments the method is implemented by the playback system 300 shown in FIG. 3 when the system 300 is used in the system of FIG. 1.

The method 1600 starts in start step 1602 with the playback system 300 being powered on and the processor 808 beginning to control the playback system 300 under control of a routine 814 stored in memory 800 which controls the playback system to implement the method of FIG. 16.

Operation proceeds from start step 1602 to receive frame information step 1603 in which captured frames and interpolated frame data, e.g., interpolated frames are received. In some embodiments step 1603 includes step 1604 in which base layer frames, e.g., encoded captured frames corresponding to a first frame rate are received and step 1606 in which interpolated frame data, e.g., data representing interpolated frames are received. The captured frames and interpolated frame data have been discussed previously with regard to the content delivery system 104 which supplies such data to the playback system and thus will not be described again in detail.

With captured and interpolated frame data having been received, operation proceeds from step 1603 to step 1608 in cases where the received captured frames are encoded. In step 1608 the received captured frames, e.g., base layer frames, are decoded to produce uuencoded captured frames before operation proceeds to step 1610. If the captured frames are received in unencoded form in step 1603, decode step 1608 is skipped and operation proceeds directly from step 1603 to step 1610.

In step 1610 one or more interpolated frames are generated from the received interpolated frame data. In some embodiments step 1610 includes steps 1612 and step 1614. In step 1612 motion vectors and/or intra-frame coded segments are used to generate portions of an interpolated frame which are different, e.g., in position or content, from one or more preceding or subsequent frames. In step 1614 content from one or more preceding or subsequent frames is used to fill one or more areas of an interpolated frame for which interpolated segment data is not provided. At the end of step 1610 the playback device has both captured frames and interpolated frames which it can use to generate a sequence of video frames having a second frame rate which is higher than the image capture rate. The second frame rate maybe and sometimes is equal to the display rate and/or reference rate implemented by the playback device. Thus by using the interpolated frames the refresh rate that can be supported in the playback device can be higher than the image capture rate while avoiding the need for the playback device to interpolate frames to support the higher playback rate. Thus in some embodiments the playback device supports a playback or frame refresh rate higher than the image capture rate without performing interpolation between frames to support the playback rate. This is because the content delivery system performs any required frame interpolation to generate interpolated frames before the frames are supplied to the playback device.

Operation proceeds from step 1610 to step 1610 wherein a frame sequence is generated by interspacing interpolated frames with captured frames, e.g., in the intended display sequence. In some embodiments where stereoscopic images are supported separate left and right eye image sequences are generated instep 1616 each having a frame rate corresponding to the second frame rate, i.e., the supported frame rate.

Operation proceeds from step 1616 to step 1618 wherein the images of the video sequence or sequences generated in step 1616 are render with left and right eye images being rendered separately, e.g., by applying the images as a texture to a mesh model.

Operation proceeds from step 1618 to step 1620 wherein at least portions of the rendered frames are output to a display. The size of the portion of the rendered frames, e.g., images, which are output depends on the size of the display device used and/or the field of view of the user. As part of step 1620, in the case of a stereoscopic implementation, different images are displayed to a user's left and right eyes, e.g., using different portions of a head mounted display.

Operation is shown proceeding from step 1620 back to step 1603 to indicate that the process can repeat over time with the playback device receiving, processing and displaying sets of images corresponding to different portions of a video sequence at different points in time.

While in some embodiments the display outputs image at the second frame rate, the methods do not preclude the playback device performing further interpolation to further increase the refresh rate that is supported by the playback device. Significantly however, at least some frame interpolation is performed outside the playback device to support a higher frame rate than the capture frame rate thereby precluding the need for the playback device to perform interpolation to achieve the second frame rate which is higher than the frame capture rate. Because frames are captured and communicated with a high level of detail a realistic 3D experience can be achieved using lower cost cameras than might otherwise be required if cameras which could support the second frame rate an same level of detail were used to capture the images.

Motion segmentation is used in some embodiments to segment captured images, e.g., frames, for processing with the processing including in some embodiments encoding for communication purposes. In some embodiments during the encoding process or as a separate pre-encoding process, images are segmented or processed on a block basis wherein an image that comprises a set of blocks, e.g., rectangular portions of a frame, are analyzes to detect objects that move, i.e., are in motion, from one frame to the next. In some embodiments the system analyzes the temporal motion for multiple blocks, e.g., in a variable size look ahead buffer that includes captured image content, e.g. blocks of previously captured frames. The data is collated to form, i.e., identify, meaningful segments of motion in a scene, e.g., a set of blocks that moves as a unit from one frame to another frame, as perceived from observing multiple frames. The set of blocks may and sometimes will correspond to a moving object such as a ball or other object that may move while other objects in a scene area such as a playing field of a sports game remain fixed. The identified image segments which are subject to motion are pruned, in some embodiments, i.e., with some image segments subject to motion being excluded from further consideration, based on spatial texture information taking into consideration angular velocity of the objects when captured into a fish-eye lens based video, to come up with final motion segments that are to be considered for additional processing and the set of segments to be considered for further processing are then, in some but not all embodiments, ranked in order of relative complexity where complexity may and sometimes does depend on the level of detail and/or number of different colors in each segment with segments having a higher level of detail and more colors or luminance levels being considered more complex than segments with less detail, fewer colors and/or a lower number of luminance levels.

In some embodiments depth analysis is used to determine the depth, e.g., distance of objects in identified segments that are subject to motion. Thus, depth of objects, and thus the depth associated with image segments representing such objects, is taken into consideration in at least some embodiments which support 3D content, e.g., where different left and right eye images are to be presented to a user during playback. Motion in the 2D left and right eye video segments, e.g., images, is taken into consideration and its effect on the perception of objects in 3D, e.g., the stereo domain, is considered when deciding how often frames should be encoded and communicated to support smooth motion of 3D objects. Taking into consideration 3D effects and depth in terms of distance from the cameras, e.g., left and right eye cameras, capturing the left and right eye images respectively, facilitates, and is used in determining of a suitable motion interpolation rate, in some embodiments, based on the segment's distance from the camera origin. Thus object distance may and sometimes does affect the rate at which an object will be interpolated with higher interrelation rates providing better 3D effects in many cases. The interpolation rate associated with a segment corresponding to an individual object can and sometime is adjusted based on the display refresh rates of the playback device or devices being supported or used. It should be appreciated since different objects are oven at different distances, different interpolation rates may be and sometimes are selected for different objects due to the difference in depth. In some embodiments objects closer to a camera, and thus which will be perceived as closer to a user during playback, are given higher priority for interpolation than more distant objects, e.g., objects at a greater depth. This is in part because near objects tend to be more noticeable and the user expects a higher level of detail in such objects than more distant objects.

In some embodiments motion estimation and representation is performed on a per segment basis where a segment may correspond to an object or set of objects of an image which may and sometimes do move in terms of position over time, e.g., with the segment changing position from frame to frame. The change in position may be and sometimes is due to motion of an object such as a ball which corresponds to the segment moving while the camera and other objects remain fixed. In some embodiments a frame rate for each segment is calculated, on an individual segment basis, based on the spatio-temporal and depth data relating to the segment. Motion interpolation in some embodiments is performed for each of the segments individually and motion vector and optimal block information is computed for the individual segments. The motion vectors and other information, e.g., fill information for image portions which can not be accurately represented by a motion vector is communicated as side information and/or meta data and may be embedded in the stream along with information representing the captured frames. Thus portions of frame determined to correspond to some segments may be refreshed by the communicated data more frequently than other portions of the captured frames. If the content is delivered to multiple sets/versions of display devices such as head mounted displays (HMDs), there can be multiple versions of the motion segment side info based on the device specifications.

As should be appreciated various features relate to image capture, processing and transmission of content in a manner that allows for efficient use of the limited data transmission capacity of a communications channel to a user playback device. By transmitting information corresponding to some segments but not entire frames for at least some frame times, and with the segments being selected based on motion and/or what portion of a fisheye lens is used to capture the portion of the image corresponding to the segment, updating of segments can occur at a high rate than the content of the entire frame is updated with the updating of segments facilitating a satisfactory 3D playback experience. During playback the received segments corresponding to motion can be decoded and displayed allowing for portions of a scene area where motion has been detected to be updated at the playback device more frequently than other portions of a scene area corresponding to the environment where the images were captured. Entire frames at a lower frame rate than the desired playback frame rate can be and sometimes are transmitted as part of a video base stream. In at least some such embodiments information corresponding to one or more segments is transmitted as enhancement information providing information for one or more segments corresponding to time periods, e.g., frame times, which occur between the frames of the base video stream. The enhancement information can be, and sometimes in combination with the base stream information at the playback device to generate a video output stream with left and right eye images that has a higher frame rate then the base video stream.

Client device playback is supported by the various methods and apparatus. The playback process on the client device includes an initial step where the base video stream, e.g., captured frame or frames, is decoded followed by side info extraction communicated with the base stream. The side information allows for updating of some segments of a displayed image at a faster rate than other segments of the displayed image. The interpolated blocks in a frame with the side information are reconstructed from one or more reference pictures, e.g., captured images, using motion compensation such that the playback frame rate matches a supported display refresh rate of the playback device which in some but not necessarily all embodiments exceeds the frame rate at which images are captured.

In some embodiments when generating an interpolated frame, to fill a gap for pixels where a gap has been created due to motion and there is no motion information supplied to fill the gap from another portion of an image, the playback device uses content from a collocated block which is adjunct in location to the position where the gap occurs to fill the gap. In cases where no motion is indicated the no-motion portion of the interpolated frame is generated by taking content from a preceding or subsequent frame with the content being taken from the location in the preceding or subsequent frame corresponding to the location where the no-motion block or blocks occur. For example, content from a block of another frame having the same x,y coordinates of a block for which motion estimated content is not specified is taken in some cases from the nearest reference frame in time to the interpolated frame being generated. In cases where the no-motion block has drastic brightness and/or color change, a more optimal bi-directional prediction/averaging may be and sometime is explicitly signaled in the information communicated to the playback device in which case luminance and/or chrominance may depend on the content of multiple frames.

Motion Representation:

Motion compensated interpolation in some embodiments involves a motion estimation to come up with satisfactory or optimal motion vectors for each variable size block shape of an object or segment. For pixels located outside the selected motion segments in a frame, the colocated blocks from the reference picture are used at the interpolated frame time by the playback device. This rule for specifying the reference for the "no-motion" pixels/segments is implicitly calculated based on nearest temporal neighbor in some embodiments. In the cases where a bidirectional prediction/averaging is preferred or optimal for the "no-motion" pixels, it is sent as part of the interpolated frame data communicated as side information which is in addition to the encoded frames of the base video layer which normally includes the captured frames. In some embodiments motion vectors for the selected motion segments are specified explicitly in the side info communicated in addition to the base layer video data along with the source block coordinates to form the complete motion segment.

Various features can be used to provide a general solution to motion fidelity that can be scaled to and customized to any number of unique HMDs and their variations. It also can be extended to AR/MR/XR applications.

Features of the method fit naturally with any Field-of-View based streaming and display methods where only the motion segments involved and related side info can be streamed along with the FoV While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed:

1. A method comprising:
obtaining a stereoscopic frame set having a first frame rate, wherein the stereoscopic frame set comprises a series of image pairs;
for each of a series of left eye images and a series of right eye images of the series of image pairs, generating one or more intermediate frames to obtain one or more left eye intermediate frames and one or more right eye intermediate frames, comprising:
obtaining motion vector data indicating motion of a portion of the stereoscopic frame set,
obtaining depth data for one or more portions of the series of left eye images of the stereoscopic frame set, and
generating one or more intermediate frames using the stereoscopic frame set, the motion vector data, and the depth data; and
generating a left eye video sequence comprising the series of left eye images and the one or more left eye intermediate frames, and a right eye video sequence comprising the series of right eye images and the one or more right eye intermediate frames, wherein the left eye video sequence and the right eye video sequence are associated with a second frame rate greater than the first frame rate.

2. The method of claim 1, wherein generating the one or more intermediate frames comprises:
generating a portion of a first intermediate frame from a first obtained frame based on the motion vector data; and
filling an area of the first intermediate frame for which interpolated segment data is not provided using content from one or more preceding frames of the stereoscopic frame set.

3. The method of claim 1, wherein the motion vector data comprises one or more 3D motion vectors.

4. The method of claim 1, wherein the left eye video sequence has a second frame rate which is higher than the first frame rate.

5. The method of claim 4, further comprising:
outputting the left eye video sequence to a display device, wherein the second frame rate corresponds to a display refresh rate supported by the display device.

6. The method of claim 5, wherein the display device is comprised in a head mounted device.

7. The method of claim 5, wherein the display device supports a 3D viewing experience.

8. A non-transitory computer readable medium comprising computer readable code executable by one or more processors to:
obtain a stereoscopic frame set having a first frame rate, wherein the stereoscopic frame set comprises a series of image pairs;
obtain motion vector data indicating motion of at least a portion of the stereoscopic frame set,
obtain depth data for one or more portions of a series of left eye images of the stereoscopic frame set, and
generate one or more left eye intermediate frames using the stereoscopic frame set, the motion vector data, and the depth data; and
generate a left eye video sequence comprising the series of left eye images and the one or more left eye intermediate frames, and a right eye video sequence comprising a series of right eye images of the stereoscopic frame set and one or more right eye intermediate frames, wherein the left eye video sequence and the right eye video sequence are associated with a second frame rate greater than the first frame rate.

9. The non-transitory computer readable medium of claim 8, wherein the computer readable code to generate the one or more intermediate frames comprises computer readable code to:
generate a portion of a first intermediate frame from a first obtained frame based on the motion vector data; and
fill an area of the first intermediate frame for which interpolated segment data is not provided using content from one or more preceding frames of the stereoscopic frame set.

10. The non-transitory computer readable medium of claim 8, wherein the motion vector data comprises one or more 3D motion vectors.

11. The non-transitory computer readable medium of claim 8, wherein the left eye video sequence has a second frame rate which is higher than the first frame rate.

12. The non-transitory computer readable medium of claim 11, further comprising computer readable code to:
output the left eye video sequence to a display device, wherein the second frame rate corresponds to a display refresh rate supported by the display device.

13. The non-transitory computer readable medium of claim 12, wherein the display device is comprised in a head mounted device.

14. The non-transitory computer readable medium of claim 12, wherein the display device supports a 3D viewing experience.

15. A system comprising:
one or more processors; and
one or more computer readable media comprising computer readable code executable by the one or more processors to:
  obtain a stereoscopic frame set having a first frame rate, wherein the stereoscopic frame set comprises a series of image pairs;
  obtain motion vector data indicating motion of a portion of the stereoscopic frame set,
  obtain depth data for one or more portions of a series of left eye images of the stereoscopic frame set, and
  generate one or more left eye intermediate frames using the stereoscopic frame set, the motion vector data, and the depth data; and
  generate a left eye video sequence comprising the series of left eye images and the one or more left eye intermediate frames, and a right eye video sequence comprising the series of right eye images and the one or more right eye intermediate frames, wherein the left eye video sequence and the right eye video sequence are associated with a second frame rate greater than the first frame rate.

16. The system of claim 15, wherein the computer readable code to generate the one or more intermediate frames comprises computer readable code to:
  generate a portion of a first intermediate frame from a first obtained frame based on the motion vector data; and
  fill an area of the first intermediate frame for which interpolated segment data is not provided using content from one or more preceding frames of the stereoscopic frame set.

17. The system of claim 15, wherein the left eye video sequence has a second frame rate which is higher than the first frame rate.

18. The system of claim 17, further comprising computer readable code to:
  output the left eye video sequence to a display device, wherein the second frame rate corresponds to a display refresh rate supported by the display device.

19. The system of claim 18, wherein the display device is comprised in a head mounted device.

20. The system of claim 18, wherein the display device supports a 3D viewing experience.

* * * * *